United States Patent
Park et al.

(10) Patent No.: US 8,179,350 B2
(45) Date of Patent: May 15, 2012

(54) DISPLAY DEVICE

(75) Inventors: Haeng-Won Park, Gyeonggi-do (KR);
Seong-Young Lee, Seoul (KR);
Yong-Soon Lee, Gyeonggi-do (KR);
Nam-Soo Kang, Gyeonggi-do (KR);
Seung-Hwan Moon, Gyeonggi-do (KR);
Bong-Jun Lee, Seoul (KR); Sung-Man Kim, Seoul (KR); Beom-Jun Kim, Seoul (KR); Yeon-Kyu Moon, Seoul (KR); Hyeong-Jun Park, Seoul (KR); Shin-Tack Kang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 994 days.

(21) Appl. No.: 11/222,799

(22) Filed: Sep. 12, 2005

(65) Prior Publication Data
US 2006/0120160 A1    Jun. 8, 2006

(30) Foreign Application Priority Data

Sep. 10, 2004  (KR) .................. 10-2004-0072507
Sep. 10, 2004  (KR) .................. 10-2004-0072685
Sep. 10, 2004  (KR) .................. 10-2004-0072749

(51) Int. Cl.
*G09G 3/36* (2006.01)
*G02F 1/136* (2006.01)

(52) U.S. Cl. ............ 345/92; 345/87; 345/90; 349/42; 349/43; 349/46

(58) Field of Classification Search ........... 345/204, 345/690–695, 208–209, 36, 40, 38, 43–46, 345/50–52, 55, 100, 103, 87–92; 315/169.3; 349/42–43, 48–49
See application file for complete search history.

(56) References Cited

U.S. PATENT DOCUMENTS

| | | | | |
|---|---|---|---|---|
| 4,781,438 A | * | 11/1988 | Noguchi | 349/54 |
| 4,904,056 A | * | 2/1990 | Castleberry | 349/162 |
| 5,151,689 A | * | 9/1992 | Kabuto et al. | 345/103 |

(Continued)

FOREIGN PATENT DOCUMENTS

CN           1407377         4/2003
(Continued)

OTHER PUBLICATIONS

English Language Abstract, Publication No. CN1407377, Apr. 2, 2003, 1 p.

*Primary Examiner* — Sumati Lefkowitz
*Assistant Examiner* — Jonathan Horner
(74) *Attorney, Agent, or Firm* — Innovation Counsel LLP

(57) ABSTRACT

A display device including a plurality of pixel electrodes arranged in a matrix including rows and columns and a plurality switching elements coupled with the pixel electrodes; a plurality of gate lines coupled with the switching elements and extending in a row direction, at least two gate lines assigned to a row; and a plurality of data lines coupled with the switching elements and extending in a column direction, a data line assigned to at least two columns, wherein each of the pixel electrodes has a first side and a second side that is farther from a data line than the first side, and the switching elements are disposed near the second sides of the pixel electrodes.

35 Claims, 18 Drawing Sheets

U.S. PATENT DOCUMENTS

| | | | |
|---|---|---|---|
| 5,193,018 A * | 3/1993 | Wu | 349/43 |
| 5,790,090 A * | 8/1998 | Libsch et al. | 345/94 |
| 6,011,531 A | 1/2000 | Mei et al. | |
| 6,075,505 A | 6/2000 | Shiba et al. | |
| 6,300,997 B1 * | 10/2001 | Saito et al. | 349/149 |
| 6,377,322 B2 * | 4/2002 | Yamaguchi et al. | 349/42 |
| 6,552,706 B1 | 4/2003 | Ikeda et al. | |
| 6,707,441 B1 * | 3/2004 | Hebiguchi et al. | 345/92 |
| 7,286,107 B2 * | 10/2007 | Lee et al. | 345/92 |
| 2002/0070905 A1 | 6/2002 | Kodate et al. | |
| 2003/0151584 A1 * | 8/2003 | Song et al. | 345/100 |
| 2003/0169379 A1 * | 9/2003 | Tsumura et al. | 349/42 |
| 2003/0189559 A1 * | 10/2003 | Lee et al. | 345/204 |

FOREIGN PATENT DOCUMENTS

| | | |
|---|---|---|
| JP | 63-186216 | 8/1988 |
| JP | 03-017614 | 1/1991 |
| JP | 05-100209 | 4/1993 |
| JP | 05-134629 | 5/1993 |
| JP | 05-265045 | 10/1993 |
| JP | 06-148680 | 5/1994 |
| JP | 10-171412 | 6/1998 |
| JP | 10-173838 A | 6/1998 |
| JP | 10-222097 | 8/1998 |
| JP | 11-194365 | 7/1999 |
| JP | 11-326943 | 11/1999 |
| JP | 11-352464 | 12/1999 |
| JP | 11-352520 A | 12/1999 |
| JP | 2001-264818 | 9/2001 |
| JP | 2002-072989 | 3/2002 |
| JP | 2002-169181 | 6/2002 |
| JP | 2003-131636 | 5/2003 |
| JP | 2003-195819 A | 7/2003 |
| KR | 10-0268817 B1 | 7/2000 |
| KR | 1020030019134 A | 6/2003 |
| WO | 03/060868 A1 | 7/2003 |

* cited by examiner

DISPLAY DEVICE

CROSS REFERENCE TO RELATED APPLICATIONS

This application claims priority to and the benefit of Korean Patent Application No. 10-2004-0072507 filed on Sep. 10, 2004, Korean Patent Application No. 10-2004-0072749 filed on Sep. 10, 2004, and Korean Patent Application No. 10-2004-0072685 filed on Sep. 10, 2004, which are hereby incorporated by reference for all purposes as if fully set forth herein.

BACKGROUND OF THE INVENTION

1. Field of the Invention

The present invention relates to a display device having an improved structure and driving scheme that simplifies manufacturing processes and reduces cost.

2. Description of Related Art

An active type display device such as an active matrix (AM) liquid crystal display (LCD) and an active matrix organic light emitting display (OLED) includes a plurality of pixels arranged in a matrix and including switching elements and a plurality of signal lines such as gate lines and data lines for transmitting signals to the switching elements. The switching elements of the pixels selectively transmit data signals from the data lines to the pixels in response to gate signals received from the gate lines for displaying images. The pixels of the LCD adjust transmittance of incident light depending on the data signals. The pixels of the OLED adjust luminance of light emission depending on the data signals.

The display device further includes a gate driver for generating and applying the gate signals to the gate lines and a data driver for applying the data signals to the data lines. Each of the gate driver and the data driver generally includes a plurality driving integrated circuit (IC) chips. The number of the IC chips is preferably few to reduce manufacturing cost. In particular, the number of the data driving IC chips is important since the data driving IC chips are much more expensive than the gate driving IC chips.

An LCD includes a pair of panels provided with field generating electrodes and a liquid crystal (LC) layer having dielectric anisotropy, which is disposed between the two panels. The field generating electrodes generally include a plurality of pixel electrodes connected to switching elements such as thin film transistors (TFTs) to be supplied with data voltages and a common electrode covering an entire surface of a panel and supplied with a common voltage. A pair of field generating electrodes that generate the electric field in cooperation with each other and a liquid crystal disposed therebetween form a liquid crystal capacitor.

The LCD applies the voltages to the field generating electrodes to generate an electric field to the liquid crystal layer. The strength of the electric field may be controlled by adjusting the voltage across the liquid crystal capacitor. Since the electric field determines the orientations of liquid crystal molecules and the molecular orientations determine the transmittance of light passing through the liquid crystal layer, the light transmittance is adjusted by controlling the applied voltages, thereby obtaining desired images on the display.

To prevent image deterioration due to long-time application of the unidirectional electric field, etc., polarity of the data voltages with respect to the common voltage is reversed every frame, every row, or every dot.

Among the various inversion types, a dot inversion reversing the data voltage polarity every given number of pixels reduces vertical crosstalk or vertical flickering due to the kickback voltage, thereby improving the image quality. However, the polarity inversion of the data voltages flowing in each data line often requires complicated driving scheme that may cause signal delay. Although the signal delay may be reduced by using a low resistivity metal, it may complicate the manufacturing process and increase the production cost.

On the contrary, a column inversion reverses the voltage polarity every given number of pixel columns. Since the column inversion does not reverse the polarity of the data voltages applied to each data line during one frame, the problems associated with signal delay are remarkably reduced.

However, the column inversion technique is inferior to the dot inversion technique in terms of vertical crosstalk and vertical flickering, etc.

SUMMARY OF THE INVENTION

This invention provides a display device having an arrangement of switching elements of pixels arranged on a substrate thereof that allows for a driving scheme that reduces the number of data driving IC chips while ensuring image quality; thereby simplifying a manufacturing process and reducing cost.

Additional features of the invention will be set forth in the description which follows, and in part will be apparent from the description, or may be learned by practice of the invention.

The invention discloses a display device including a plurality of pixels arranged in a matrix, each pixel having a switching element coupled thereto; a plurality of gate lines coupled with the switching elements and extending in a row direction of the matrix, each row including at least two of the gate lines; and a plurality of data lines coupled with the switching elements, each data line extending in a column direction of the matrix, wherein each of the pixel electrodes have a first side and a second side that is farther from a data line than the first side, and the switching elements are arranged near the second sides of the pixel electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

Figure 1:
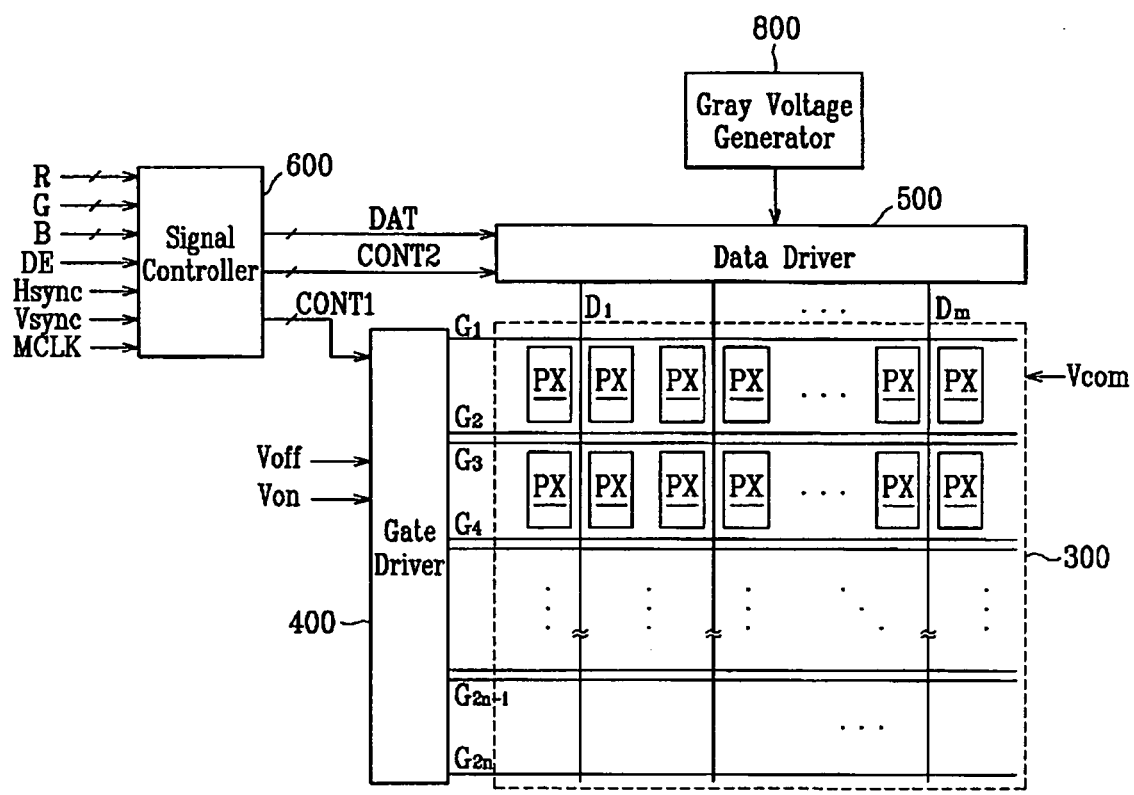
FIG. 1 is a block diagram of an LCD according to an embodiment of the invention.

The present invention is described more fully below with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, the element may be directly on the other element or intervening elements may also be present. In contrast, when an element is referred to as being "directly on" another element, there are no intervening elements present.

Liquid crystal displays (LCD) as an example of a display device according to embodiments of the invention are described below with reference to the accompanying drawings.

Figure 2:
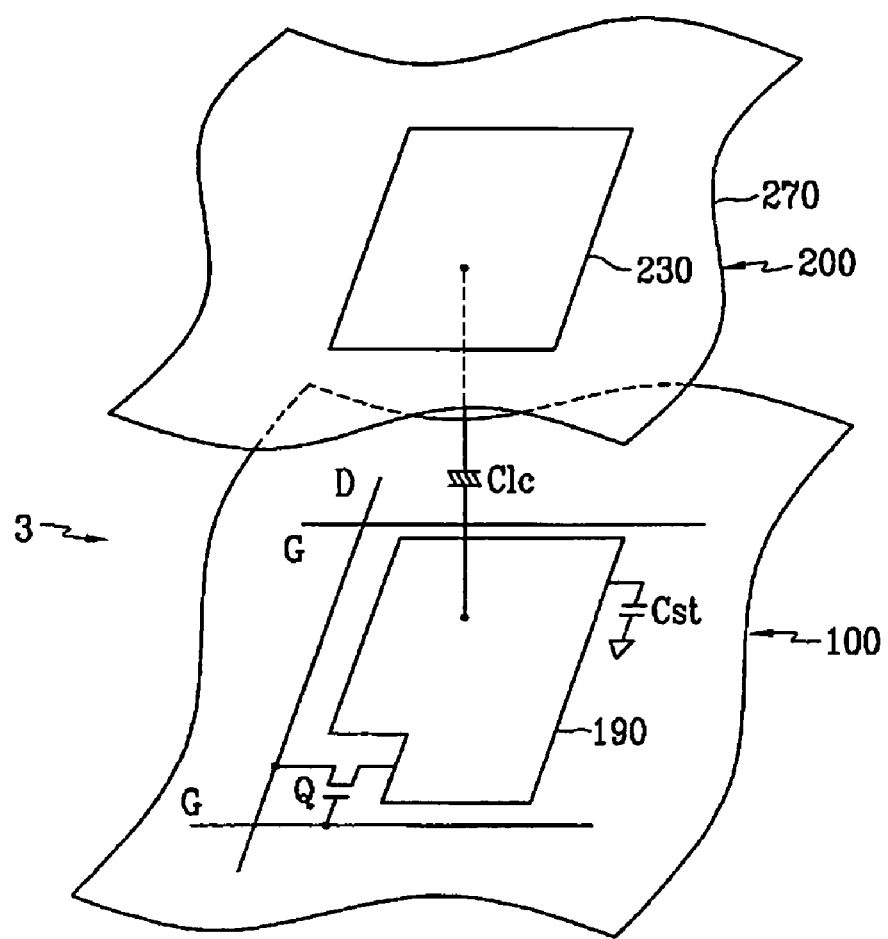
FIG. 2 is an equivalent circuit diagram of a pixel of an LCD according to an embodiment of the invention.

FIG. 1 is a block diagram of an LCD according to an embodiment of the invention. FIG. 2 is an equivalent circuit diagram of a pixel of an LCD according to an embodiment of the invention.

Referring to FIG. 1, an LCD includes a LC panel assembly 300, a gate driver 400 and a data driver 500 that are connected to the panel assembly 300, a gray voltage generator 800 connected to the data driver 500, and a signal controller 600 controlling the above elements.

Referring to FIG. 1, the panel assembly 300 includes a plurality of display signal lines $G_1$-$G_{2n}$ and $D_1$-$D_m$ and a plurality of pixels PX connected thereto and arranged substantially in a matrix. In a structural view shown in FIG. 2, the panel assembly 300 includes a lower panel and an upper panel 200 and a LC layer 3 arranged therebetween.

The display signal lines $G_1$-$G_{2n}$ and $D_1$-$D_m$ are arranged on the lower panel 100 and include a plurality of gate lines $G_1$-$G_{2n}$ transmitting gate signals (also referred to as "scanning signals"), and a plurality of data lines $D_1$-$D_m$ transmitting data signals. The gate lines $G_1$-$G_{2n}$ extend substantially in a row direction and are substantially parallel to each other, while the data lines $D_1$-$D_m$ extend substantially in a column direction and are substantially parallel to each other.

Referring to FIG. 2, each pixel PX includes a switching element Q connected; e.g., coupled, with a gate line G and a data line D, and a LC capacitor Clc and a storage capacitor Cst that are connected; e.g., coupled, with the switching element Q. The storage capacitor Cst may be omitted as necessary.

The switching element Q including a TFT is provided on the lower panel 100 and includes three terminals: a control terminal connected; e.g., coupled, with the gate line G; an input terminal connected; e.g., coupled, with the data line D; and an output terminal connected; e.g., coupled, with both the LC capacitor Clc and the storage capacitor Cst.

The LC capacitor Clc includes a pixel electrode 190 provided on the lower panel 100 and a common electrode 270 provided on an upper panel 200 as two terminals. The LC layer 3 arranged between the two electrodes 190 and 270 operates as dielectric of the LC capacitor Clc. The pixel electrode 190 is connected; e.g., coupled, with the switching element Q, and the common electrode 270 is supplied with a common voltage Vcom and covers an entire surface of the upper panel 200. It is understood that the common electrode 270 may be provided on the lower panel 100, and at least one of the pixel electrode 190 and the common electrode 270 may have a shape of approximately a bar or a stripe.

The storage capacitor Cst is an auxiliary capacitor for the LC capacitor Clc. The storage capacitor Cst includes the pixel electrode 190 and a separate signal line, which is provided on the lower panel 100, overlapping the pixel electrode 190 via an insulator, and is supplied with a predetermined voltage such as the common voltage Vcom. Alternatively, the storage capacitor Cst includes the pixel electrode 190 and an adjacent gate line called a previous gate line, which overlaps the pixel electrode 190 via an insulator.

For a color display, each pixel PX may uniquely represents one of primary colors (i.e., spatial division) or each pixel PX may sequentially represents the primary colors in turn (i.e., temporal division) such that spatial or temporal sum of the primary colors are recognized as a desired color. FIG. 2 shows an example of spatial division in that each pixel PX includes a color filter 230 representing one of the primary colors in an area of the upper panel 200 facing the pixel electrode 190. Alternatively, the color filter 230 may be provided on or under the pixel electrode 190 on the lower panel 100.

An example of a set of the primary colors includes a red color, a green color, and a blue color. The pixels PX including red, green, and blue color filters are referred to as red, green, and blue pixels, respectively. A representative arrangement of red, green, and blue pixels is a stripe arrangement where each pixel row includes red, green, and blue pixels arranged in turn and each pixel column represents only one color.

One or more polarizers (not shown) are attached to at least one of the panels 100 and 200. In addition, one or more retardation films (not shown) for compensating refractive anisotropy may be arranged between the polarizer(s) and the panel(s).

Figure 3:
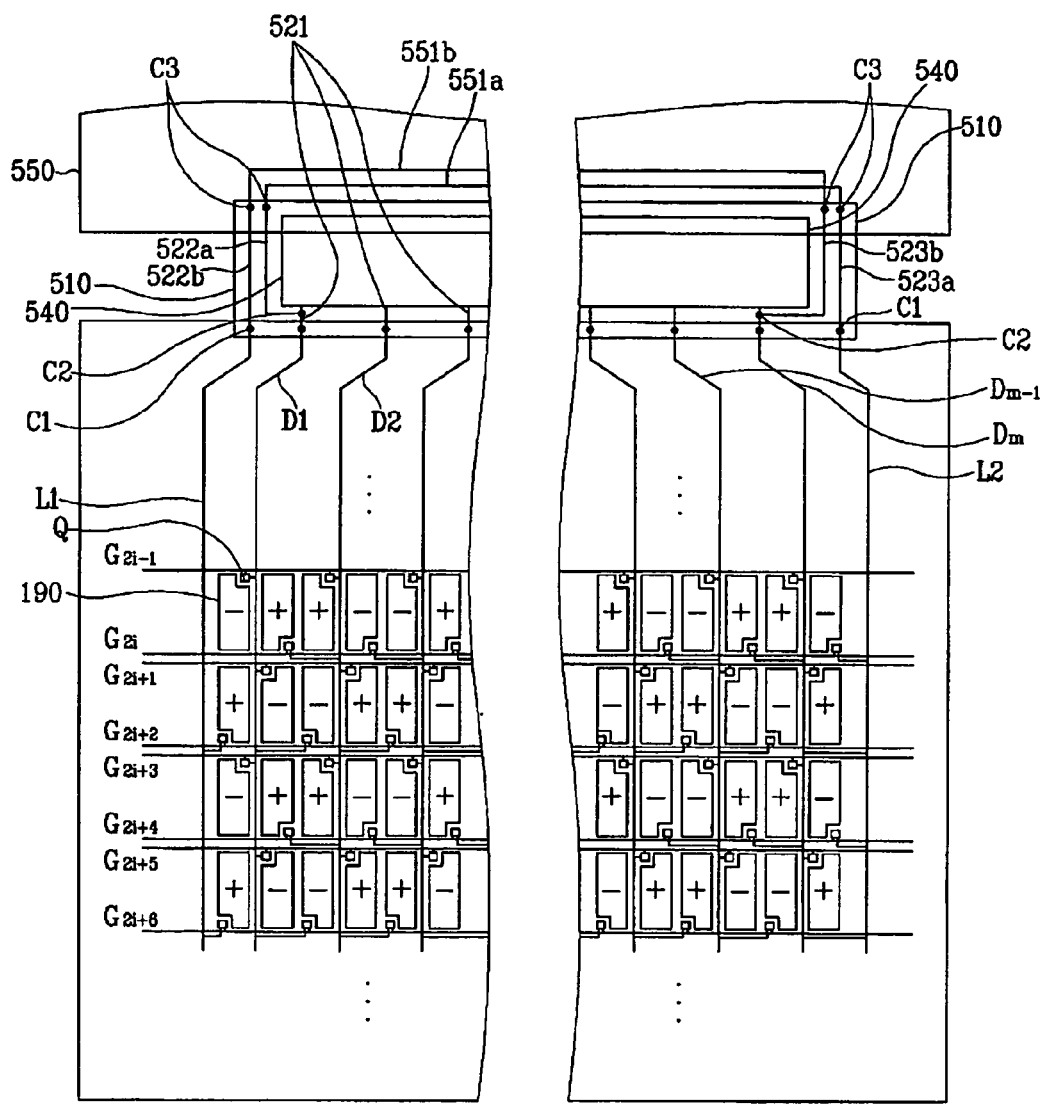
FIG. 3 schematically shows a structure of an LCD according to an embodiment of the invention.

Referring to FIG. 3, a detailed configuration of an LCD according to an embodiment of the invention is described.

FIG. 3 schematically shows a structure of an LCD according to an embodiment of the invention.

Referring to FIG. 3, an LCD includes a panel assembly 300, a printed circuit board (PCB) 550, and at least one flexible printed circuit (FPC) film 510 attached to the panel assembly 300 and the PCB 550.

The PCB 550 is arranged near an upper edge portion of the panel assembly 300 and mounts or has affixed thereto several circuit elements such as the signal controller 600, the gray voltage generator 800, etc. The FPC film 510 mounts a data driving IC 540 and includes a plurality of output lead lines 521 connected; e.g., coupled, with output terminals of the data driving IC 540 and a plurality of input lead lines (not shown) connected; e.g., coupled, with input terminals of the data driving IC 540.

The panel assembly 300 includes gate lines ($G_1$, $G_2$, ...), data lines ($D_1$, $D_2$, ...), and pixels and the pixels include pixel electrodes 190 and switching elements Q connected; e.g., coupled, with the gate lines ($G_1$, $G_2$, ...), the data lines ($D_1$, $D_2$, ...), and the pixel electrodes 190. The data lines ($D_1$, $D_2$, ...) are connected; e.g., coupled, with the lead lines 521 on the FPC film 510 via contact points C1.

The panel assembly 300 further includes a left dummy line L1 and a right dummy line L2 extending substantially parallel to the data lines ($D_1$, $D_2$, ...) and disposed left to the leftmost data line $D_1$ and right to the rightmost data line $D_m$, respectively. The PCB 550 further includes bypass lines 551*a* and 551*b* and the FPC film 510 further includes connection lines 522*a*, 522*b*, 523*a* and 523*b*, e.g., two pairs of connection lines.

The right dummy line L2 is electrically connected; e.g., coupled, with a lead line 521, which is connected; e.g., coupled, with the leftmost data line $D_1$, through the connection line 523*a*, the bypass line 551*a*, and the connection line 522*a*. Similarly, the left dummy line L1 is electrically connected; e.g., coupled, with another lead line 521, which is connected; e.g., coupled, with the rightmost data line $D_m$, through the connection line 522*b*, the bypass line 551*b*, and the connection line 523*b*. The connection lines 522*b* and 523*b* are connected; e.g., coupled, with the dummy lines L1 and L2 at contact points C1 and the connection lines 522*a* and 523*a* are connected to the lead lines 521 at contact points C2. The connection lines 522*a*, 522*b*, 523*a* and 523*b* are connected; e.g., coupled, with the bypass lines 551*a* and 551*b* at contact points C3.

Each pair of gate lines $G_{2i-1}$ and $G_{2i}$ (i=1, 2, ...) is arranged at the upper and lower sides of a row of pixel electrodes 190. Each data line $D_j$ (j=1, 2, 3, ...) is arranged between two adjacent columns of the pixel electrodes 190. In other words, each data line $D_j$ (j=1, 2, 3, ...) is arranged between adjacent pairs of pixel electrodes 190. The left dummy line L1 is arranged left of the leftmost pixel column and the right dummy line L2 is arranged right of the rightmost pixel column.

The pixel electrodes 190 are connected; e.g., coupled, with the gate lines ($G_1$, $G_2$, ...) and the data lines ($D_1$, $D_2$, ...) or the dummy lines L1 and L2 via the switching elements Q that are arranged near the corners of the pixel electrodes 190. For example, the connection between the pixel electrodes 190 and the dummy lines L1 and L2 may be omitted because the dummy lines L1 and L2 may be considered as the data lines ($D_1$, $D_2$, ...) in relation to the connection relation.

The corner positions of the pixel electrodes 190, which are assigned to the respective switching elements Q coupled thereto, vary in rows and columns depending on the connection between the pixel electrode 190 and the gate lines ($G_1$, $G_2$, ...) and the data lines ($D_1$, $D_2$, ...). For example, a switching element Q for a pixel electrode 190 to be connected; e.g., coupled, with an upper gate line $G_{2i-1}$ and a left data line ($D_1$, $D_2$, ...) is arranged near the upper left corner of the pixel electrode 190, which is the nearest corner from the upper gate line $G_{2i-1}$ and the left data line ($D_1$, $D_2$, ...).

A row of pixel electrodes 190 are alternately connected; e.g., coupled, with a pair of gate lines $G_{2i-1}$ and $G_{2i}$ adjacent thereto and alternately connected; e.g., coupled, with the nearest data line and the next nearest data line. A column of pixel electrodes 190 are alternately connected; e.g., coupled, with upper gate lines $G_{2i-1}$ and lower gate lines $G_{2i}$ adjacent thereto and alternately connected; e.g., coupled, with the nearest data line and the next nearest data line.

Accordingly, a pair of pixel electrodes 190 arranged between two adjacent data lines and a pair of gate lines are connected; e.g., coupled, with the same data line but to different gate lines.

The following is a discussion of an arrangement of the switching elements in the pixel matrix and their connection to the respective gate lines and data lines. The pixels in each pixel row have switching element positioned alternately near an upper corner and a lower corner. The pixels in each pixel column have switching elements positioned alternately near an upper corner and a lower corner and also positioned alternately at a left side corner and a right side corner. A pair of gate lines is arranged at the upper and lower sides of each pixel row where the switching elements of the pixels in each pixel row are connected; e.g., coupled, with the gate line positioned nearest the respective switching element. Each data line is arranged between adjacent pairs of pixel columns and connected; e.g., coupled, with switching elements associated with the pairs of pixels. In one embodiment, each pair of pixels having switching elements connected; e.g., coupled, with the same data line is disposed in the same pixel row. In another embodiment, two pixels in each pixel row disposed between two adjacent data lines have switching elements connected; e.g., coupled, with the same data line. Finally, in yet another embodiment, two adjacent pixels in each pixel column have switching elements connected; e.g., coupled, with different data lines.

The above described arrangement reduces the number of the data lines $D_1$, $D_2$, $D_3$, ... into half of the pixel columns. The arrangement and the connections of the pixel electrodes 190 with the gate lines and the data lines shown in FIG. 3 may also be varied.

An LC panel assembly according to an embodiment of the invention is described below with reference to FIGS. 4, 5, 6 and 7.

Figure 4:
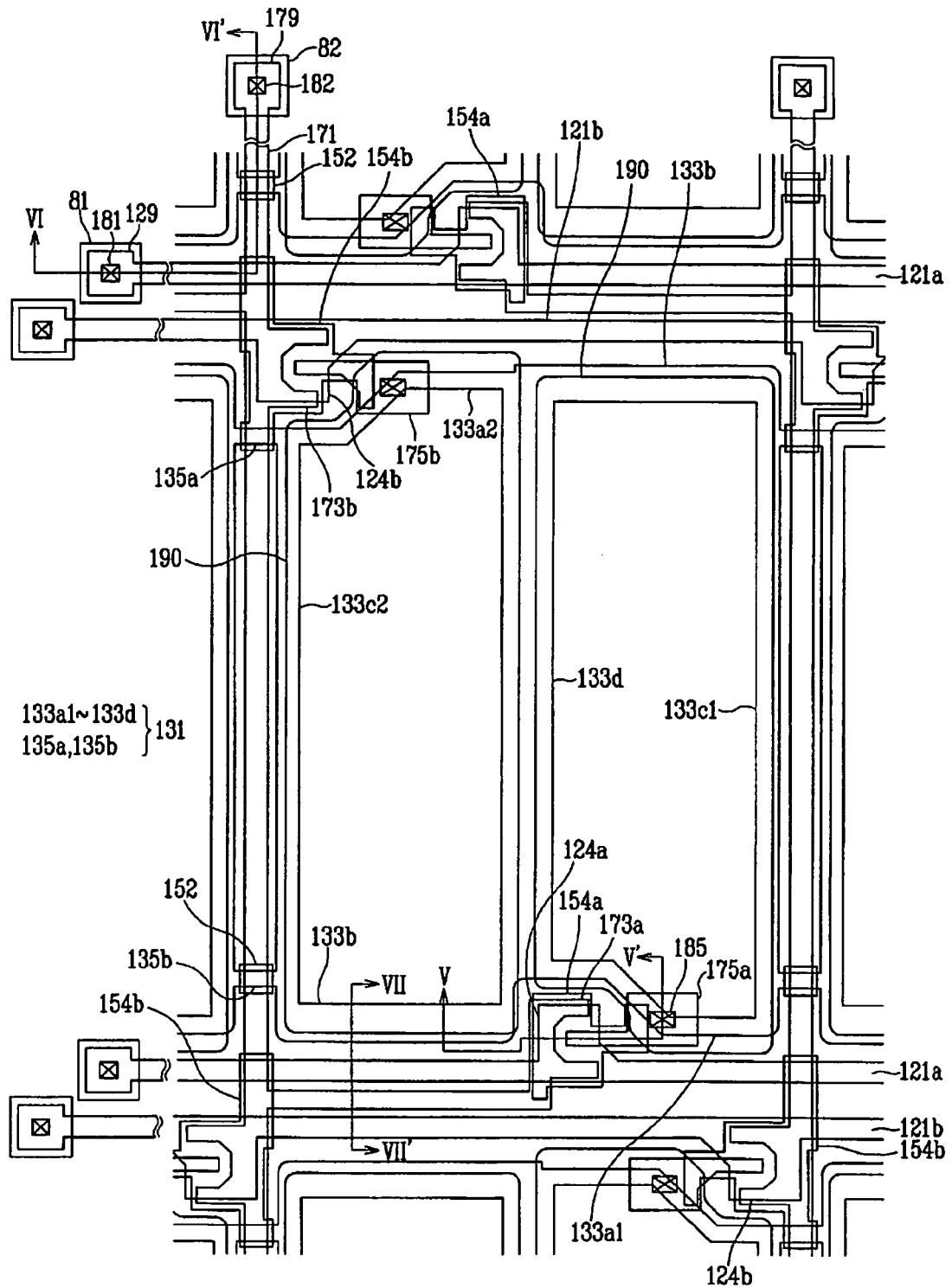
FIG. 4 is a layout view of a lower panel according to an embodiment of the invention.
Figure 5:
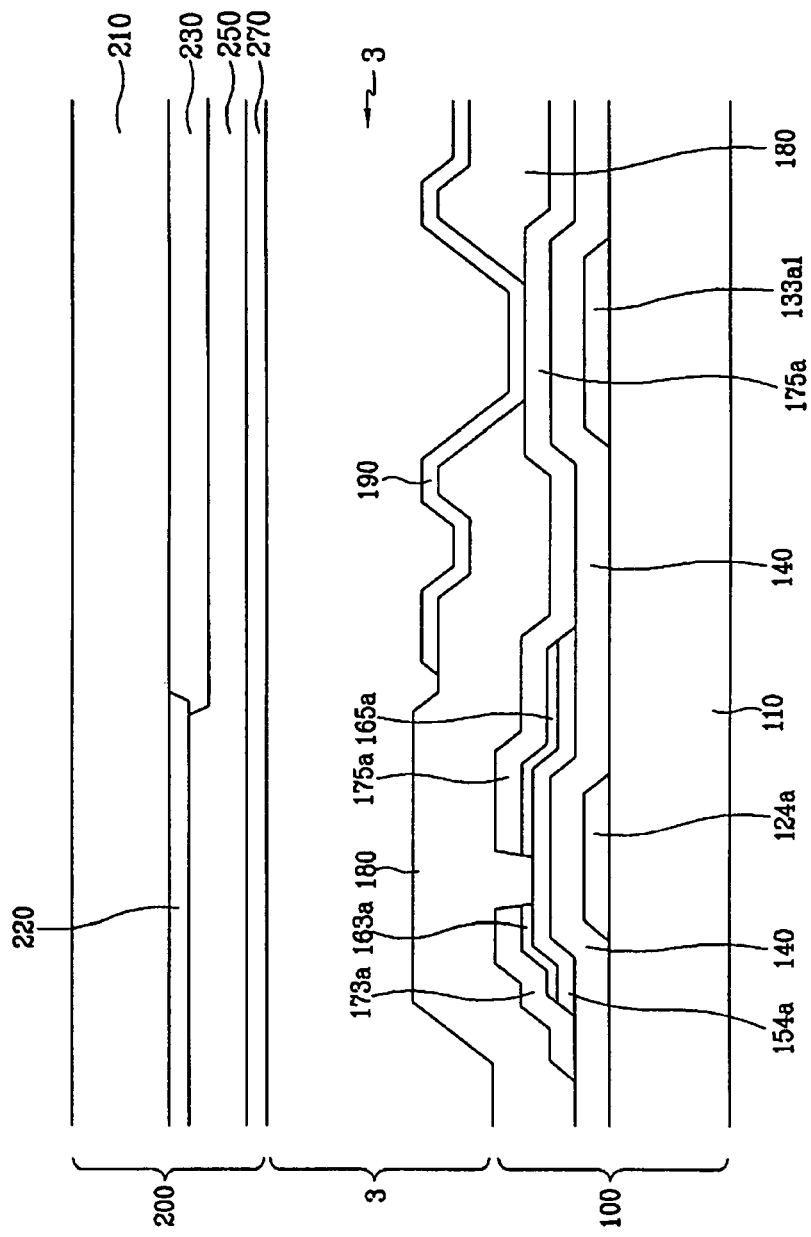
FIGS. 5, 6 and 7 are sectional views of the lower panel shown in FIG. 4 taken along lines V-V', VI-VI', and VII-VII', respectively.
Figure 6:
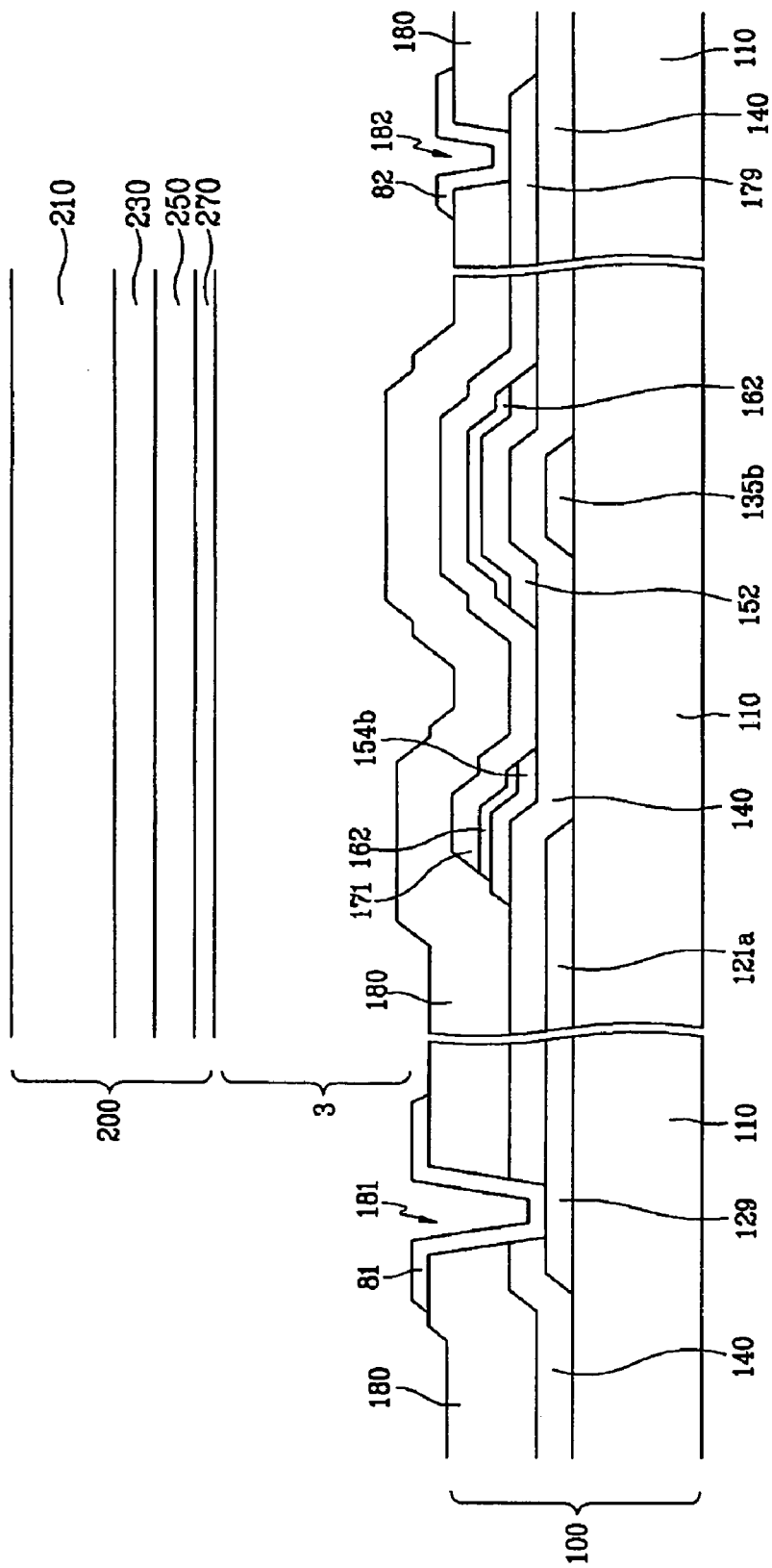
Figure 7:
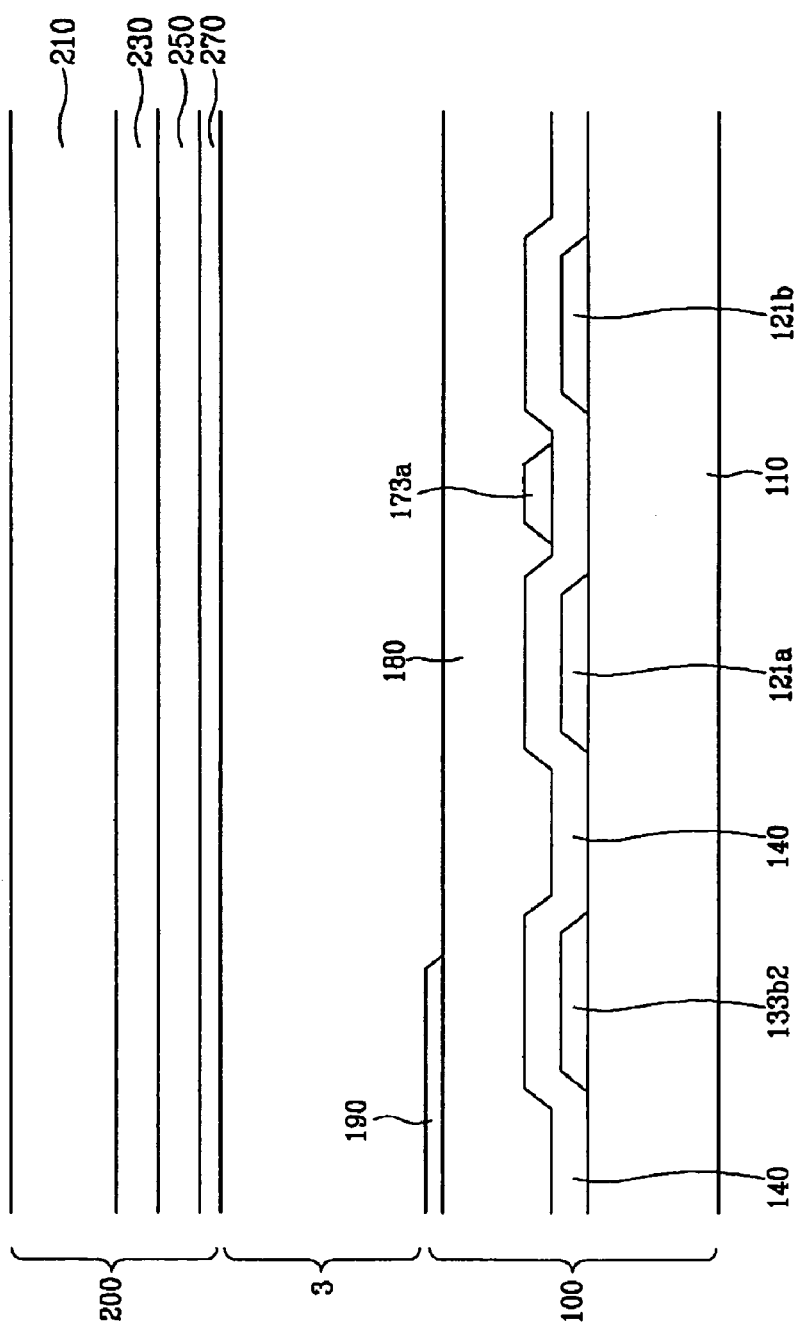

FIG. 4 is a layout view of a lower panel (TFT array panel) according to an embodiment of the invention. FIGS. 5, 6 and 7 are sectional views of an LC panel assembly including the lower panel shown in FIG. 4 taken along lines V-V', VI-VI', and VII-VII', respectively.

Referring to FIGS. 4, 5, 6, and 7, an LC panel assembly includes a TFT array panel 100, a common electrode panel 200 facing the TFT array panel 100, and a liquid crystal layer 3 interposed between the panels 100 and 200.

Regarding the TFT array panel 100, a plurality of pairs of gate lines 121*a* and 121*b* and a plurality of storage electrode lines 131 are formed on an insulating substrate 110, such as transparent glass or plastic.

The gate lines 121*a* and 121*b* transmit gate signals and extend substantially in a transverse direction. The pair of gate lines 121*a* and 121*b* are separated from each other and include a plurality of gate electrodes 124*a* and 124*b* extending toward each other, e.g., upward and downward. Each of the gate lines 121*a* and 121*b* further includes an end portion 129 having a sufficiently large area for contact with another layer or an external driving circuit.

A gate driving circuit (not shown) for generating the gate signals may be mounted on a flexible printed circuit (FPC) film (not shown), which may be attached with the substrate 110, directly mounted on the substrate 110, or integrated onto the substrate 110. The gate lines 121*a* and 121*b* may extend to be connected; e.g., coupled, with a driving circuit that may be integrated with the substrate 110.

The storage electrode lines 131 are supplied with a predetermined voltage, and each of the storage electrode lines 131 is arranged between two adjacent gate lines 121. Each of the storage electrode lines 131 includes a plurality of sets of storage electrodes 133*a*1, 133*a*2, 133*b*1, 133*b*2, 133*c*1, 133*c*2 and 133*d* and a plurality of pairs of storage connections 135*a* and 135*b* connecting adjacent sets of storage electrodes 133*a*1-133*d*.

Each set of the storage electrodes 133*a*1-133*d* substantially form a pair of rectangular shapes, each rectangular shape includes a first storage electrode 133*a*1 or 133*a*2 extending in the transverse direction, a second storage electrode 133*b*1 or 133*b*2 extending in the transverse direction and arranged opposite the first storage electrode 133*a*1 or 133*a*2, a third storage electrode 133*c*1 or 133*c*2 extending in a longitudinal direction and connecting one ends of the first and the second storage electrodes 133*a*1 and 133*b*1 or 133*a*2 and 133b2, and a fourth storage electrode 133d extending in the longitudinal direction and connecting the other ends of the first and the second storage electrodes 133a1 and 133b1 or 133a2 and 133b2. The pair of rectangular shapes commonly share the fourth storage electrode 133d and have substantially a 180-degree rotational symmetry with respect to a center of the fourth storage electrode 133d. The first storage electrodes 133a1 and 133a2 are curved near where the gate electrodes 124a and 124b are positioned. However, the storage electrode lines 131 may have various shapes and arrangements.

The gate lines 121a and 121b and the storage electrode lines 131 may be made of a metal containing Al or Al alloy, a metal containing Ag or Ag alloy, a metal containing Cu or Cu alloy, a metal containing metal Mo or Mo alloy, Cr, Ta, or Ti. However, the gate lines 121a and 121b may have a multi-layered structure that include two conductive films (not shown) having different physical properties. One of the films may be made of a low resistivity metal containing Al, a metal containing Ag, and a metal containing Cu for reducing signal delay or voltage drop.

The other film may be made of material such as a metal containing Cr, Ta, or Ti, which has good physical, chemical, and electrical contact characteristics with other materials such as indium tin oxide (ITO) or indium zinc oxide (IZO). For example, the combination of the two films may include a lower Cr film and an upper Al (alloy) film and a lower Al (alloy) film and an upper Mo (alloy) film. However, it is understood that the gate lines 121a and 121b and the storage electrode lines 131 may be made of various metals or conductors.

The lateral sides of the gate lines 121a and 121b and the storage electrode lines 131 are inclined relative to a surface of the substrate, and the inclination angle thereof ranges about 30 degrees to about 80 degrees.

A gate insulating layer 140, which may be made of silicon nitride (SiNx) or silicon oxide (SiOx), is formed on the gate lines 121a and 121b and the storage electrode lines 131.

A plurality of pairs of semiconductor islands 154a and 154b and a plurality of semiconductor islands 152 are formed on the gate insulating layer 140. Each of the semiconductor islands 154a and 154b is arranged on a gate electrode 124a or 124b and includes extensions covering edges of the gate line 121a and 121b and a storage connection 135a. The semiconductor islands 152 are arranged on the storage connections 135b and cover edges of the storage connections 135b. The semiconductor islands 152 and 154 may be made of hydrogenated amorphous silicon (abbreviated to "a-Si") or polysilicon.

A plurality of pairs of ohmic contact islands 163a and 165a are formed on the semiconductor islands 154a, and a plurality of ohmic contact islands 162 are formed on the semiconductor islands 152. In addition, a plurality of pairs of ohmic contact islands (not shown) are formed on the semiconductor islands 154b. The ohmic contacts 162, 163a and 165a may be made of n+ hydrogenated a-Si heavily doped with n type impurity such as phosphorous or they may be made of silicide.

The lateral sides of the islands 152, 154a and 154b and the ohmic contacts 162, 163a and 165a are inclined relative to the surface of the substrate 110, and the inclination angles thereof are preferably in a range of about 30 degrees to about 80 degrees.

A plurality of data lines 171 and a plurality of drain electrodes 175a and 175b are formed on the ohmic contacts 162, 163a and 165a and the gate insulating layer 140.

The data lines 171 transmit data signals and extend substantially in the longitudinal direction to intersect the gate lines 121a and 121b and the storage connections 135a and 135b. Each data line 171 includes a plurality of source electrodes 173a and 173b extending toward the gate electrodes 124a and 124b and curved like a character J. Each of the source electrodes 173a extends in an area between adjacent two gate lines 121a and 121b.

Each of the data lines 171 further includes an end portion 179 having a sufficiently large area for contact with another layer or an external driving circuit. A data driving circuit (not shown) for generating the data signals may be mounted on a FPC film (not shown), which may be attached with the substrate 110, directly mounted on the substrate 110, or integrated with the substrate 110. The data lines 171 may be connected with a driving circuit that may be integrated with the substrate 110.

The drain electrodes 175a and 175b are separated from the data lines 171 and arranged opposite to the source electrodes 173a and 173b with respect to the gate electrodes 124a and 124b. Each of the drain electrodes 175a and 175b includes a relatively wide end portion and a relatively narrow end portion. The wide end portion overlaps a storage electrode 133a and the narrow end portion is partly enclosed by a source electrode 173a or 173b.

A gate electrode 124a/124b, a source electrode 173a/173b, a drain electrode 175a/175b, and a semiconductor island 154a/154b together form a TFT having a channel formed in the semiconductor island 154a/154b located between the source electrode 173a/173b and the drain electrode 175a/175b.

The data lines 171 and the drain electrodes 175a and 175b may be made of a refractory metal such as Cr, Mo, Ta, Ti, or an alloy thereof. However, the data lines 171 and the drain electrodes 175a and 175b may be a multilayered structure that includes a refractory metal film (not shown) and a low resistivity film (not shown). For example, the multi-layered structure may include a double-layered structure that may include a lower Cr/Mo (alloy) film and an upper Al (alloy) film, and a triple-layered structure that may include a lower Mo (alloy) film, an intermediate Al (alloy) film, and an upper Mo (alloy) film. However, the data lines 171 and the drain electrodes 175a and 175b may be made of various metals or conductors.

The data lines 171 and the drain electrodes 175a and 175b have inclined edge profiles relative to the surface of the substrate, and the inclination angles thereof range about 30 degrees to about 80 degrees.

The ohmic contacts 162, 163a and 165a only arranged between the underlying semiconductor islands 152, 154a and 154b and the overlying conductors 171, 175a and 175b thereon and they reduce the contact resistance therebetween. The semiconductor islands 152 and the extensions of the semiconductor islands 154b disposed on the gate lines 121a and 121b and the storage connections 135a and 135b are arranged such as to smoother or level the profile of the surface, thereby preventing the disconnection of the data lines 171. The semiconductor islands 152, 154a and 154b include some exposed portions, which are not covered with the data lines 171 and the drain electrodes 175a and 175b, such as, for example, portions located between the source electrodes 173a and 173b and the drain electrodes 175a and 175b.

A passivation layer 180 may be formed on the data lines 171, the drain electrodes 175a and 175b, and the exposed portions of the semiconductor islands 152, 154a and 154b. The passivation layer 180 may be made of an inorganic insulator material or an organic insulator material and the passivation layer 180 may have a substantially level top surface. The inorganic insulator material may include silicon nitride and silicon oxide. The organic insulator material may have a photosensitivity and dielectric constant of less than about 4.0. The passivation layer 180 may include a lower film containing an inorganic insulator and an upper film containing an organic insulator such that it has the insulating characteristics of the organic insulator while the organic insulator material prevents damage to the exposed portions of the semiconductor islands 152, 154a and 154b.

The passivation layer 180 has a plurality of contact holes 182 and 185 exposing the end portions 179 of the data lines 171 and the drain electrodes 175a and 175b, respectively. The passivation layer 180 and the gate insulating layer 140 have a plurality of contact holes 181 exposing the end portions 129 of the gate lines 121a and 121b.

A plurality of pixel electrodes 191 and a plurality of contact assistants 81 and 82 are arranged on the passivation layer 180, and may be made of a transparent conductor material such as ITO or IZO or a reflective conductor material such as Ag, Al, Cr, or an alloy thereof.

The pixel electrodes 191 are physically and electrically connected; e.g., coupled, with the drain electrodes 175a and 175b via the contact holes 185 so that the pixel electrodes 191 receive data voltages from the drain electrodes 175a and 175b. The pixel electrodes 191 that are supplied with the data voltages generate electric fields in cooperation with a common electrode 270 of the common electrode panel that is supplied with a common voltage, which determine the orientations of liquid crystal molecules (not shown) of the liquid crystal layer 3. A pixel electrode 191 and the common electrode 270 form a LC capacitor Clc, which stores applied voltages after the TFT is turned off.

A pixel electrode 191 overlaps the storage electrodes 133a1-133d. The pixel electrode 191 and a drain electrode 175a and 175b connected with the pixel electrode 191, and the storage electrode line 131 form a storage capacitor Cst, which increases the voltage storing capacity of the LC capacitor Clc.

The pixel electrodes 190 cover the wide end portions of the drain electrodes 175a and 175b and have longitudinal edges arranged on the storage electrodes 133c1, 133c2 and 133d so that the storage electrodes 133c1, 133c2 and 133d block the interference between the pixel electrodes 191 and the data lines 171 and the interference between the pixel electrodes 191.

The contact assistants 81 and 82 are connected; e.g., coupled, with the end portions 129 of the gate lines 121a and 121b and the end portions 179 of the data lines 171 through the contact holes 181 and 182, respectively. The contact assistants 81 and 82 protect the end portions 129 and 179 and improve the adhesion between the end portions 129 and 179 and external devices.

Below is a description of the common electrode panel 200 according to an embodiment of the invention.

A light blocking member 220, referred to as a black matrix, for preventing or significantly reducing light leakage is arranged on an insulating substrate 210. The light blocking member 220 may include a plurality of openings facing the pixel electrodes 191 and it may have substantially the same planar like shape as the pixel electrodes 191. Alternatively, the light blocking member 220 may include a plurality of substantially rectilinear portions facing the data lines 171 and a plurality of widened portions facing the TFTs on the TFT array panel 100.

A plurality of color filters 230 are formed on the substrate 210 and they are arranged substantially in the areas enclosed or defined by the light blocking member 220. The color filters 230 may extend substantially in the longitudinal direction along the pixel electrodes 191. The color filters 230 may represent one of the primary colors such as red, green and blue colors.

An overcoat 250 may be formed on the color filters 230 and the light blocking member 220. The overcoat 250 is preferably made of (organic) insulator and it prevents or substantially prevents the color filters 230 from being exposed to contaminants and also provides a substantially level surface. The overcoat 250 may be omitted.

A common electrode 270 may be formed on the overcoat 250. The common electrode 270 is preferably made of a transparent conductive material such as ITO and IZO.

Alignment layers (not shown) that may be homogeneous may be arranged on inner surfaces of the panels 100 and 200.

Referring again to FIG. 1, the gray voltage generator 800 generates two sets of a plurality of gray voltages related to the transmittance of the pixels. The gray voltages in one set have a positive polarity with respect to the common voltage Vcom, while the grey voltages in the other set have a negative polarity with respect to the common voltage Vcom.

The gate driver 400 is connected; e.g., coupled, with the gate lines $G_1$-$G_{2n}$ of the panel assembly 300 and synthesizes the gate-on voltage Von and the gate-off voltage Voff from an external device to generate gate signals for application to the gate lines $G_1$-$G_{2n}$.

The data driver 500 is connected; e.g., coupled, with the data lines $D_1$-$D_m$ of the panel assembly 300 and transmits data voltages, which are selected from the gray voltages supplied from the gray voltage generator 800, to the data lines $D_1$-$D_m$.

The gate driver 400 and the data driver 500 may each include at least one integrated circuit (IC) chip mounted on the panel assembly 300 or on a flexible printed circuit (FPC) film in a tape carrier package (TCP) type, which are attached to the LC panel assembly 300. Alternately, the drivers 400 and 500 may be integrated with the panel assembly 300 along with the display signal lines $G_1$-$G_{2n}$ and $D_1$-$D_m$ and the TFT switching elements Q.

The signal controller 600 controls the operation of the gate driver 400 and the gate driver 500.

The operation of at least the above-described LCD is described below.

The signal controller 600 is supplied with input image signals R, G and B and input control signals controlling the display thereof such as a vertical synchronization signal Vsync, a horizontal synchronization signal Hsync, a main clock MCLK, and a data enable signal DE, from a graphics controller (not shown), e.g., externally provided. After generating gate control signals CONT1 and data control signals CONT2 and processing the image signals R, G and B suitable for the operation of the panel assembly 300 according to the input control signals and the input image signals R, G and B, the signal controller 600 transmits the gate control signals CONT1 to the gate driver 400, and transmits the processed image signals DAT and the data control signals CONT2 to the data driver 500. The processing of the image signals R, G and B includes the rearrangement of the image data R, G and B according to the pixel arrangement of the panel assembly 300.

The gate control signals CONT1 include a scanning start signal STV for instructing to start scanning and a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing the start of data transmission for a group of pixels, a load signal LOAD for instructing to apply the data voltages to the data lines $D_1$-$D_m$, and a data clock signal HCLK. The data control signal CONT2 may further include an inversion signal RVS for reversing the polarity of the data voltages with respect to the common voltage Vcom.

Responding to the data control signals CONT2 from the signal controller 600, the data driver 500 receives a packet of the image data DAT for half of a row of pixels from the signal controller 600, converts the image data DAT into analog data voltages selected from the gray voltages supplied from the gray voltage generator 800, and applies the data voltages to the data lines $D_1$-$D_m$. It is understood that the packet may contain various amounts of image data DAT.

The gate driver 400 applies the gate-on voltage Von to the gate line $G_1$-$G_{2n}$ in response to the gate control signals CONT1 received from the signal controller 600, thereby turning on the switching elements Q connected thereto. The data voltages applied to the data lines $D_1$-$D_m$ are supplied to the pixels through the activated switching elements Q.

The difference between the data voltage and the common voltage Vcom is represented as a voltage across the LC capacitor Clc, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts the light polarization into the light transmittance.

By repeating this procedure by a unit of half of a horizontal period, which is denoted by "½H" and is equal to half period of the horizontal synchronization signal Hsync or the data enable signal DE, all gate lines $G_1$-$G_{2n}$ are sequentially supplied with the gate-on voltage Von during a frame, thereby applying the data voltages to all pixels. When the next frame starts after one frame finishes, the inversion control signal RVS applied to the data driver 500 is controlled such that the polarity of the data voltages is reversed, which is referred to as "frame inversion".

Other than the frame inversion, the data driver 500 varies the polarity of the data voltages flowing in each data line during one frame, thereby changing the polarity of the pixel voltages. Since the connections between the pixels and the data lines $D_1$-$D_m$ are complex, as shown in FIG. 3, the polarity inversion pattern generated by the data driver 500 is different from the polarity inversion of the pixel voltages appearing on the panel assembly 300. Hereinafter, the polarity inversion of the data driver 500 is referred to as "driver inversion" and the polarity inversion of the pixel voltages appearing on the panel assembly 300 is referred to as "apparent inversion."

The polarity inversion pattern shown in FIG. 3 is a driver inversion of a column inversion and an apparent inversion of 1×2 dot inversion. The driver column inversion indicates that the polarity of the data voltages in each data line is fixed or constant and the polarity of the data voltages in adjacent data lines is opposite. The apparent 1×2 dot inversion indicates that the polarity is inverted every row and every two columns.

The above-described arrangements of the switching elements of the pixels realize a 1×2 dot-type apparent inversion for a given column-type driver inversion. The column-type driver inversion diversifies materials available for the data lines and thus it is easy to find a material that is suitable for simplifying the manufacturing process. In addition, the dot-type apparent inversion disperses the difference in the luminance due to the kickback voltages between the positive-polarity pixel voltages and the negative-polarity pixel voltages to thereby reduce vertical line defect.

Now, an arrangement of pixels in an LCD according to another embodiment of the present invention is described with reference to FIG. 8.

Figure 8:
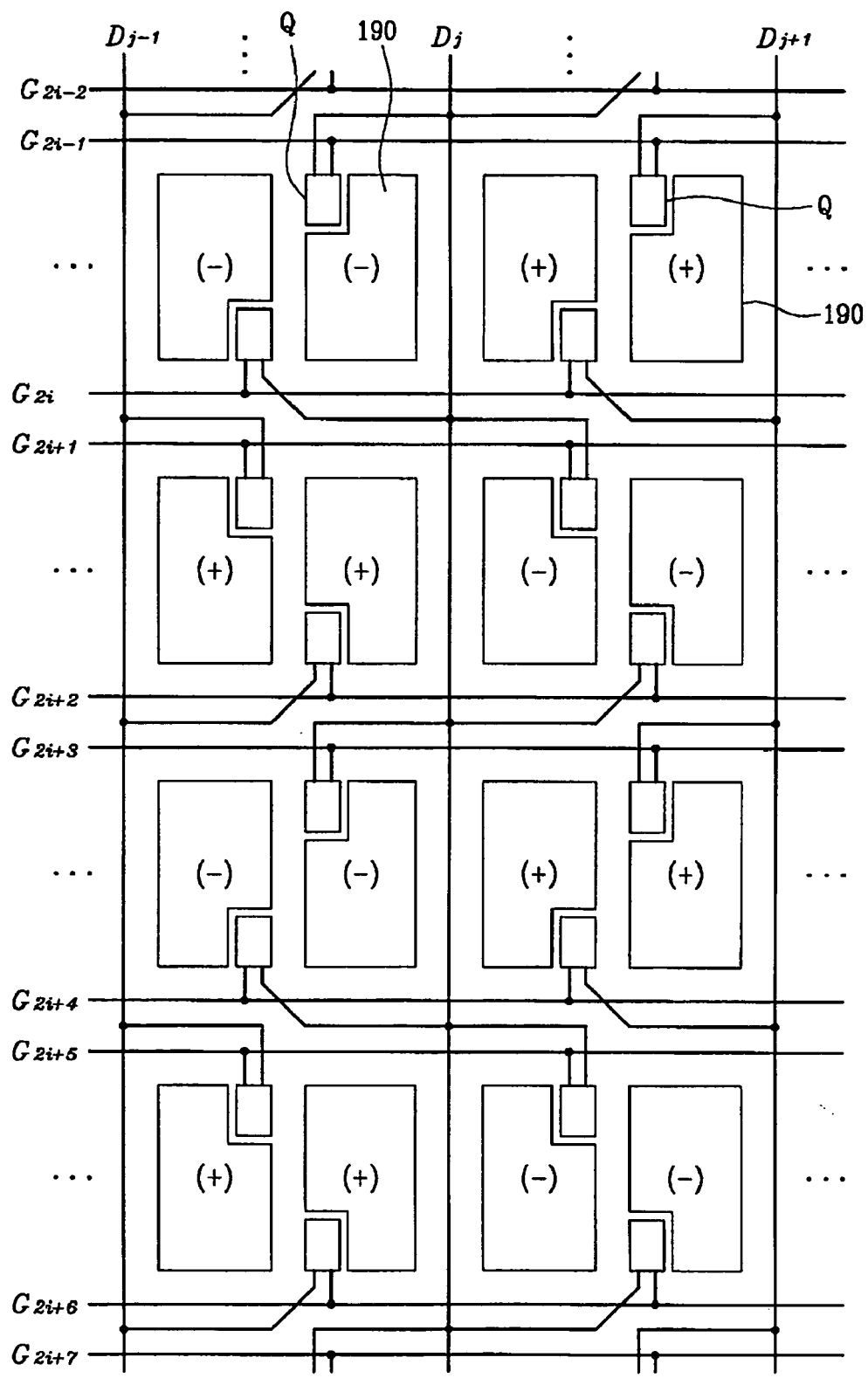
FIG. 8 schematically shows an arrangement of pixels in an LCD according to another embodiment of the invention.

FIG. 8 schematically shows an arrangement of pixels in an LCD according to another embodiment of the invention.

Referring to FIG. 8, the arrangement of pixels according to this embodiment is similar to the arrangement of pixels shown in FIG. 3.

In detail, each pair of gate lines $G_{2i-1}$ and $G_{2i}$ (i=1, 2, . . . ) are disposed at the upper side and the lower side of a row of pixel electrodes 190. Each data line $D_j$ (j=1, 2, 3, . . . ) is arranged between two adjacent columns of the pixel electrodes 190.

In addition, two switching elements Q connected; e.g., coupled, with a pair of pixel electrodes 190 in a pixel row are arranged between two adjacent data lines $D_j$ and $D_{j+1}$ and are connected to different gate lines $G_{2i-1}$ and $G_{2i}$. For example, as shown in FIG. 8, a switching element Q arranged near an upper corner of a pixel electrode 190 is connected; e.g., coupled, with an upper gate line $G_{2i-1}$, and a switching element Q arranged near a lower corner of a pixel electrode 190 is connected; e.g., coupled, with the lower gate line $G_{2i}$.

Each connection connecting the switching elements Q and the data lines is arranged between two adjacent gate lines.

The switching elements Q are arranged further from the data lines in the embodiment shown in FIG. 8 than in the embodiment shown in FIG. 3. In detail, each of the switching elements Q is arranged near a longitudinal edge of a pixel electrode 190, which is farther one of two longitudinal edges of the pixel electrode 190 from the data lines.

In summary, the pixels and the switching elements Q are arranged such that the switching elements Q of a pair of adjacent pixels in a row, which are arranged between two adjacent data lines, are connected; e.g., coupled, with a single data line. Further, a pair of adjacent pixels in a column are connected; e.g., coupled, with different data lines, and the switching elements of the pair of adjacent pixels are arranged at opposite sides of the pixel electrodes 190 in the column direction. In a pixel row, pairs of pixels having the same configuration are repeatedly arranged.

A TFT array panel including the pixel arrangement shown in FIG. 8 is described in detail with reference to FIG. 9 and FIG. 10.

Figure 9:
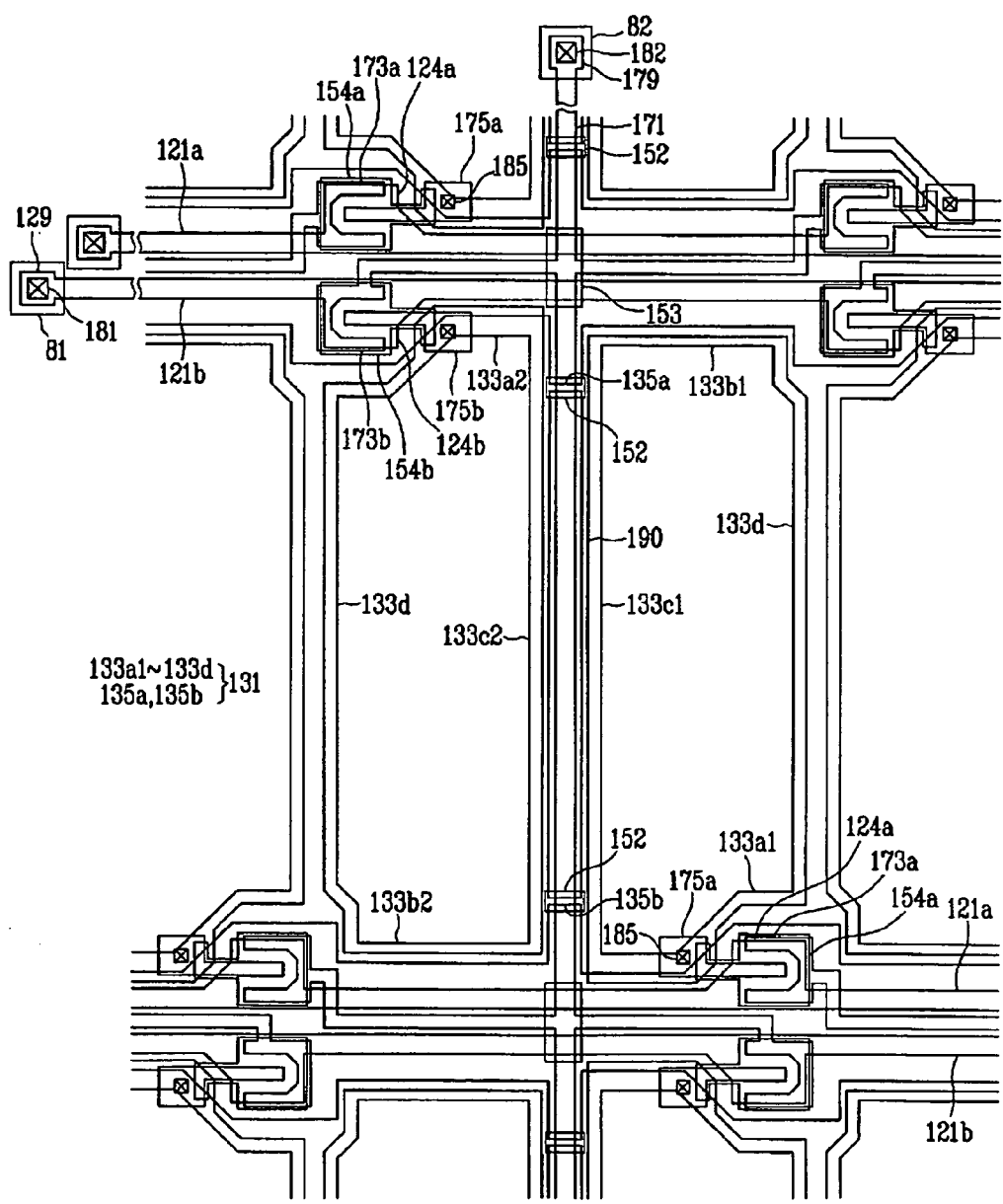
FIG. 9 and FIG. 10 are layout views of TFT array panels according to embodiments of the invention.
Figure 10:
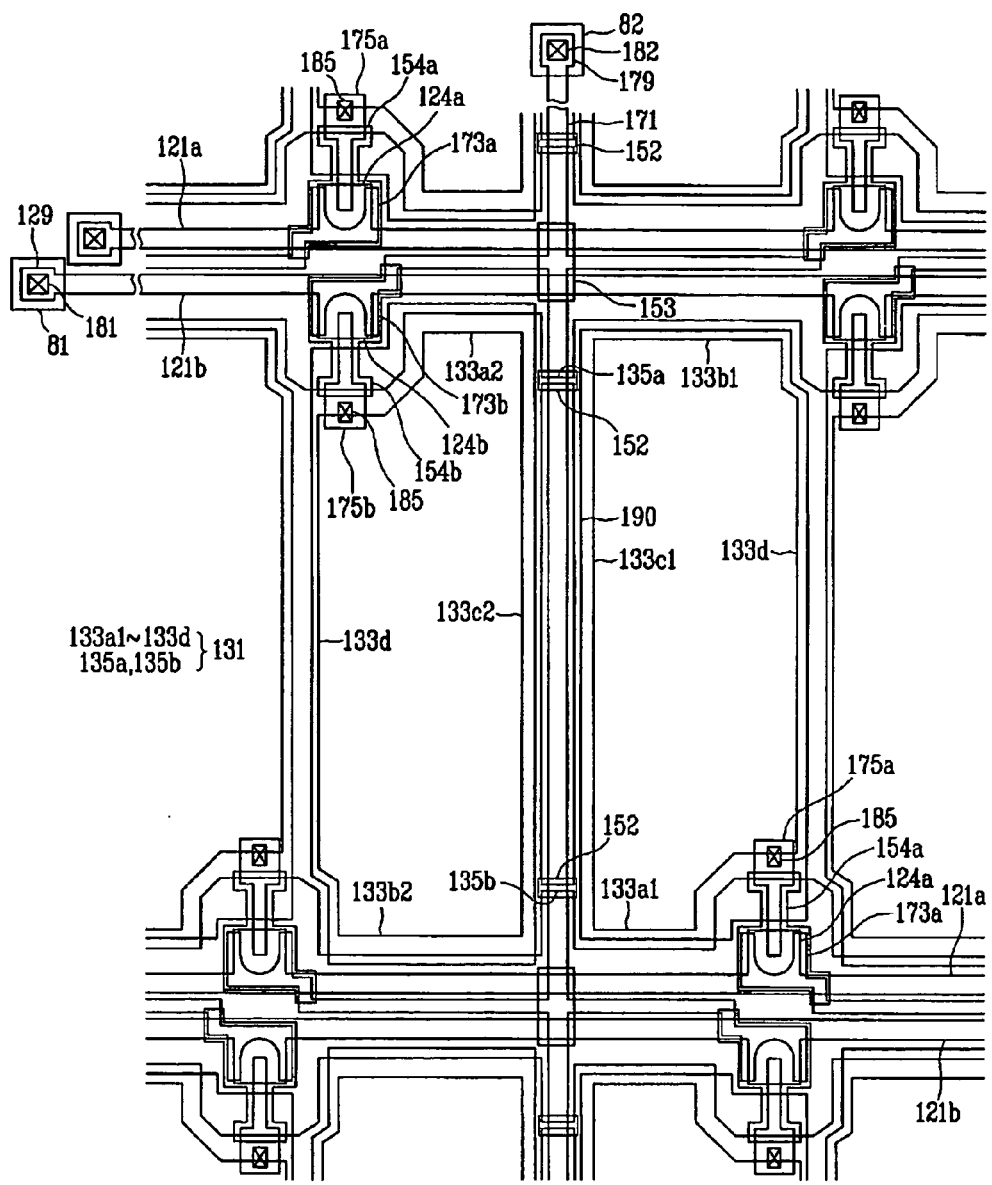

FIGS. 9 and 10 are layout views of TFT array panels according to embodiments of the invention.

Layered structures of the TFT array panels according to the embodiments shown in FIG. 9 and FIG. 10 are substantially the same as the layered structures shown in FIGS. 5, 6, and 7, and thus the cross sections of the TFT array panels are omitted for purposes of convenience.

A plurality of gate lines 121a and 121b including gate electrodes 124a and 124b and end portions 129, and a plurality of storage electrode lines 131 including storage electrodes 133a1-133d and storage connections 135a and 135b are arranged on a substrate 110, and a gate insulating layer 140. A plurality of semiconductor islands 152, 154a and 154b, and a plurality of ohmic contacts 162, 163a, 163b, 165a and 165b are sequentially arranged thereon. A plurality of data lines 171 including source electrodes 173a and 173b and end portions 179 and a plurality of drain electrodes 175a and 175b are formed on the ohmic contacts 162, 163a, 163b, 165a and 165b and the gate insulating layer 140. A passivation layer 180 is formed thereon. A plurality of contact holes 181, 182 and 185 are provided at the passivation layer 180 and the gate insulating layer 140. A plurality of pixel electrodes 190 and a plurality of contact assistants 81 and 82 are formed on the passivation layer 180.

Each of the TFT array panels shown in FIG. 9 and FIG. 10 further includes a plurality of semiconductor islands 153 arranged at intersections of the gate lines 121a and 121b and the data lines 171 and a plurality of ohmic contacts (not shown) arranged between the semiconductor islands 153 and the data lines 171. The semiconductor islands 153 smooth or substantially level the profile of the surface, thereby preventing the disconnection of the data lines 171.

In addition, each of the source electrodes 173a and 173b shown in FIG. 10 has a shape of a substantially U-like or curved character. The drain electrodes 175a and 175b extend in a longitudinal direction to intersect upper edges of the gate electrodes 124a and 124b. Since the upper edges of the gate electrodes 124a and 124b are substantially parallel to an extension direction of the gate lines 121a and 121b, the overlapping areas of the drain electrodes 175a and 175b and the gate electrodes 124a and 124b are substantially uniform when the drain electrodes 175a and 175b move in the extension direction of the gate lines 121a and 121b.

The embodiments shown in FIGS. 8, 9, and 10 have reduced vertical stripes as compared with the embodiment shown in FIGS. 4, 5, 6, and 7, which are described below with reference to FIG. 11 and FIG. 12.

Figure 11:
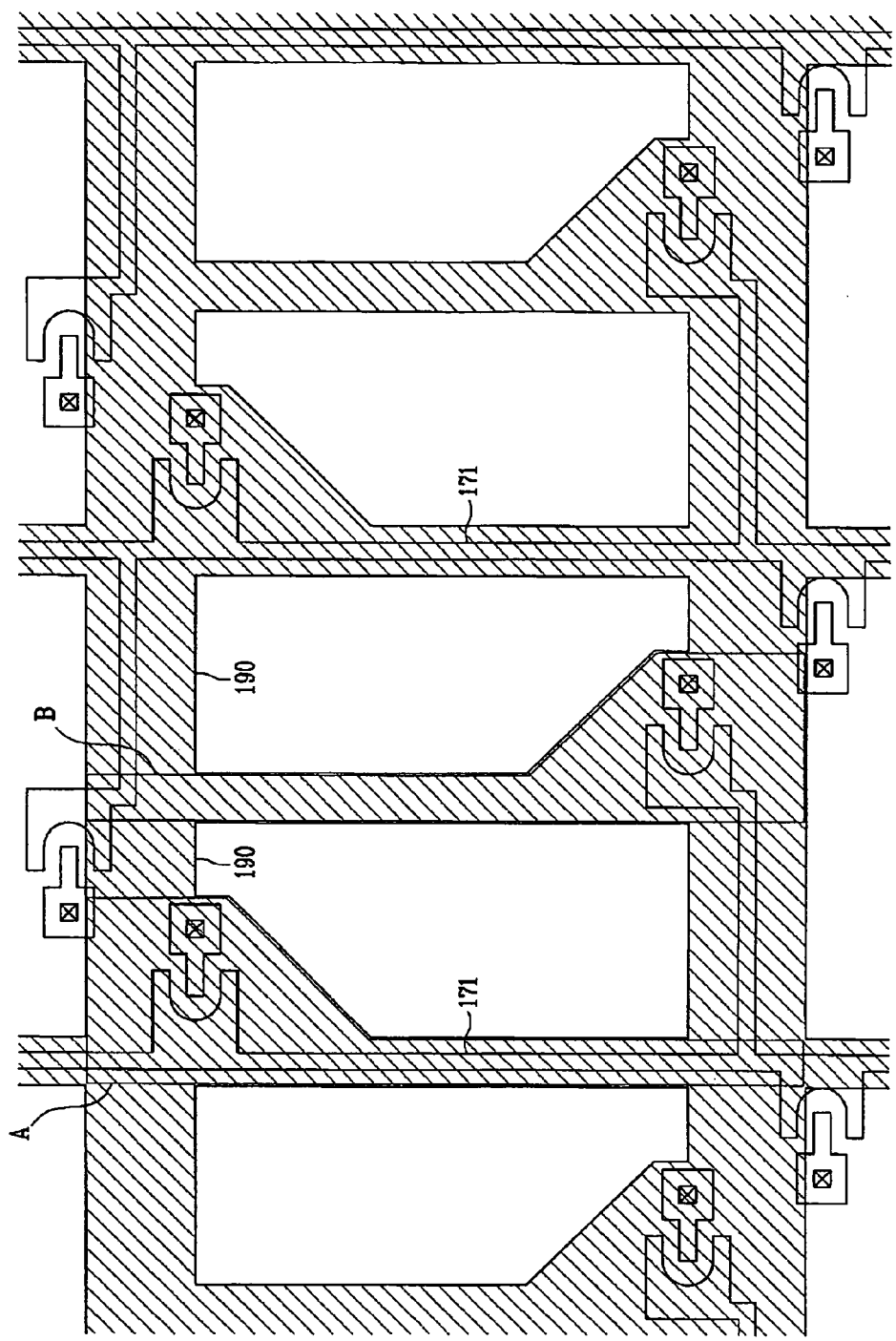
FIG. 11 is a schematic layout view of the LCD shown in FIGS. 4-7.
Figure 12:
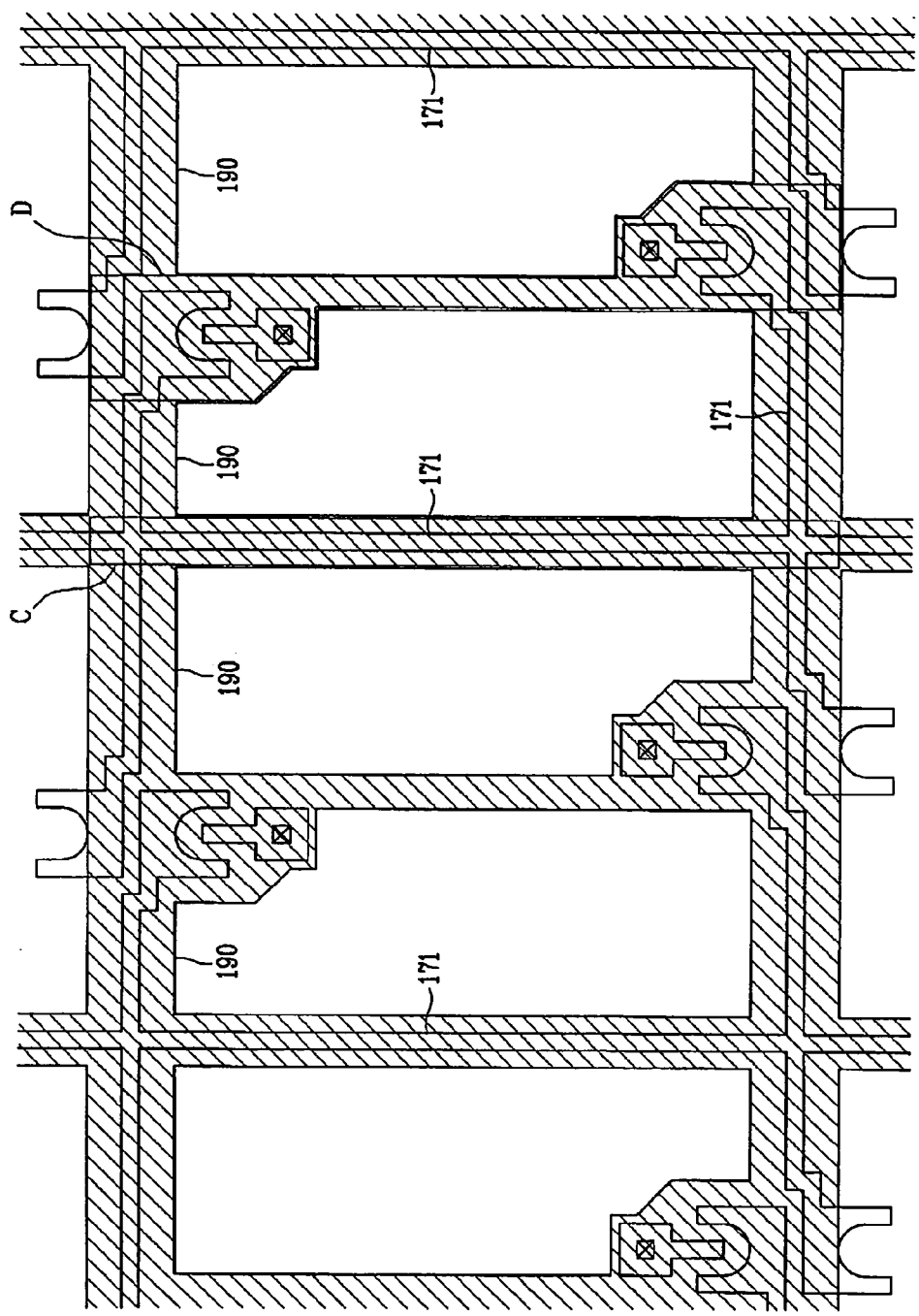
FIG. 12 is a schematic layout view of the LCD shown in FIGS. 8, 9, and 10.

FIG. 11 is a schematic layout view of the LCD shown in FIGS. 4, 5, 6, and 7, and FIG. 12 is a schematic layout view of the LCD shown in FIGS. 8, 9, and 10. The hatched areas in FIG. 11 and FIG. 12 are those areas covered by light blocking members.

The distance between two adjacent pixel electrodes 190 is different between when there is a data line 171 arranged between the pixel electrodes 190 and when there is no data line arranged between the pixel electrodes 190. An area having a larger width than a width of the data line 171 is required so that the data line may be arranged between the pixel electrodes 190.

Due to the difference in the distance between the pixel electrodes 190, the width of the light blocking member depends on whether the data line 171 is so arranged. For example, for a 15-inch WXGA LCD, the width of a portion of the light blocking member disposed on a data line 171 may be about 29 microns, while the width of a portion of the light blocking member disposed between the pixel electrodes 190 without a data line may be about 18 microns.

Referring to FIG. 11, the area of a portion A of the light blocking member covering a data line 171 is larger than the area of a portion B of the light blocking member without a data line. Accordingly, a pair of pixels arranged between the data line 171 have an effective display area that is smaller than an effective display area of a pair of pixels that do not have a data line arranged therebetween, thereby causing a longitudinal stripe defect.

However, the LCD shown in FIGS. 8, 9, and 10 arranges the switching elements Q at portions located between the pixel electrodes 190 that do not include a data line. Therefore, the area of a portion D of the light blocking member includes an area occupied by the switching elements Q as well as an area of a gap between the pixel electrodes 190, while the area of a portion C which includes a the data line 171 does not include an area that is occupied by the switching elements Q. The area occupied by the switching elements Q may compensate for the area increased by interposing the data line 171, thereby reducing the difference in the areas between the portions C and D, which decreases the longitudinal stripe defect.

Pixel arrangements according to other embodiments of the invention are described below with reference to FIGS. 13, 14 and 15.

Figure 13:
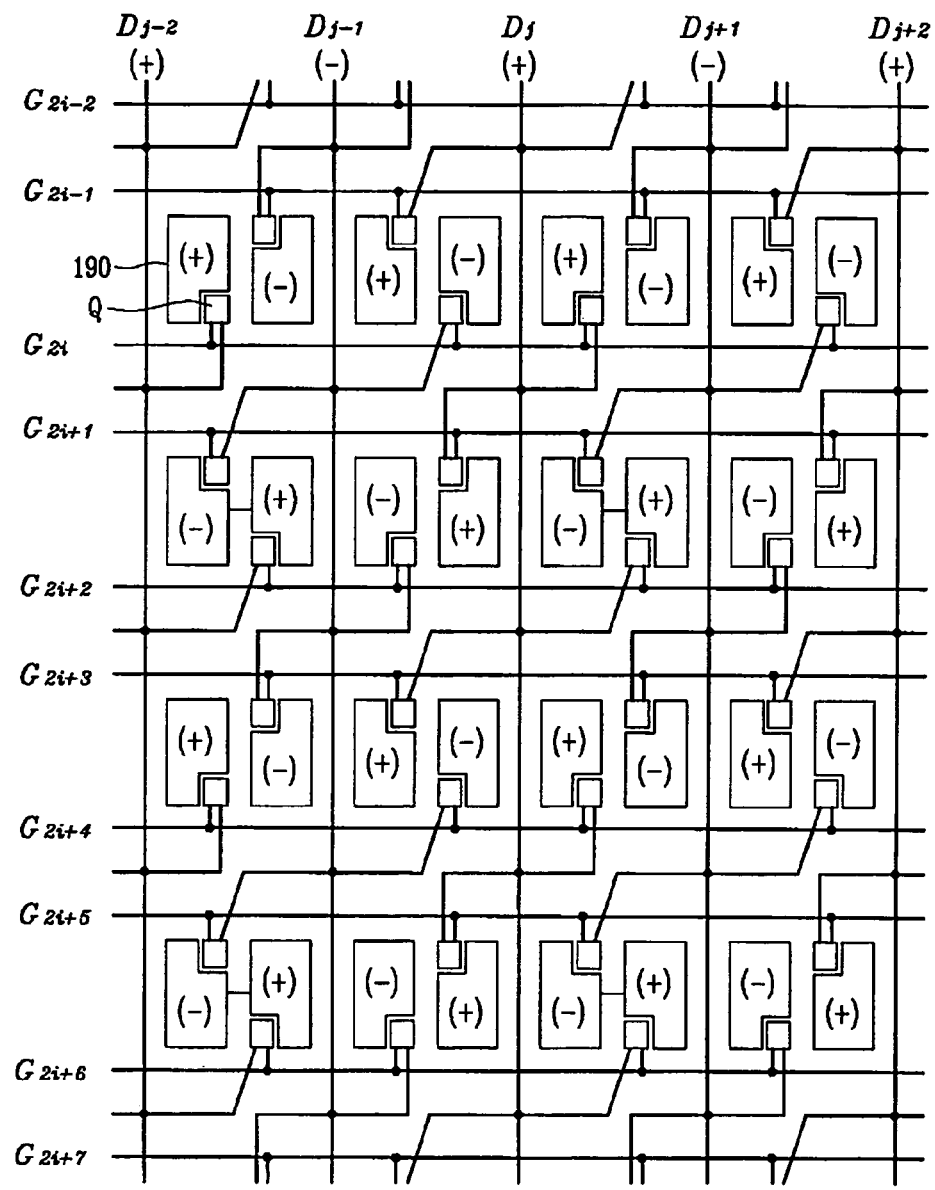
FIGS. 13, 14, 15, 16, 17, and 18 schematically show arrangements of pixels in an LCD according to other embodiments of the invention.
Figure 14:
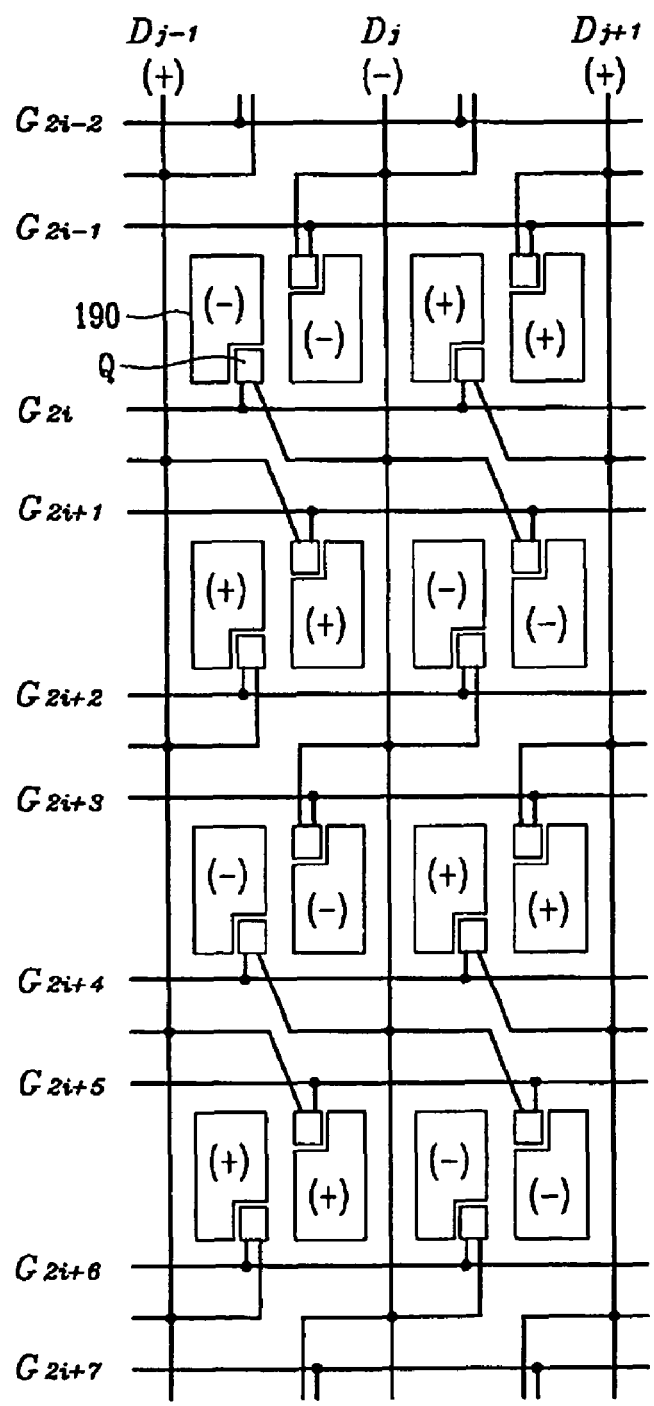
Figure 15:
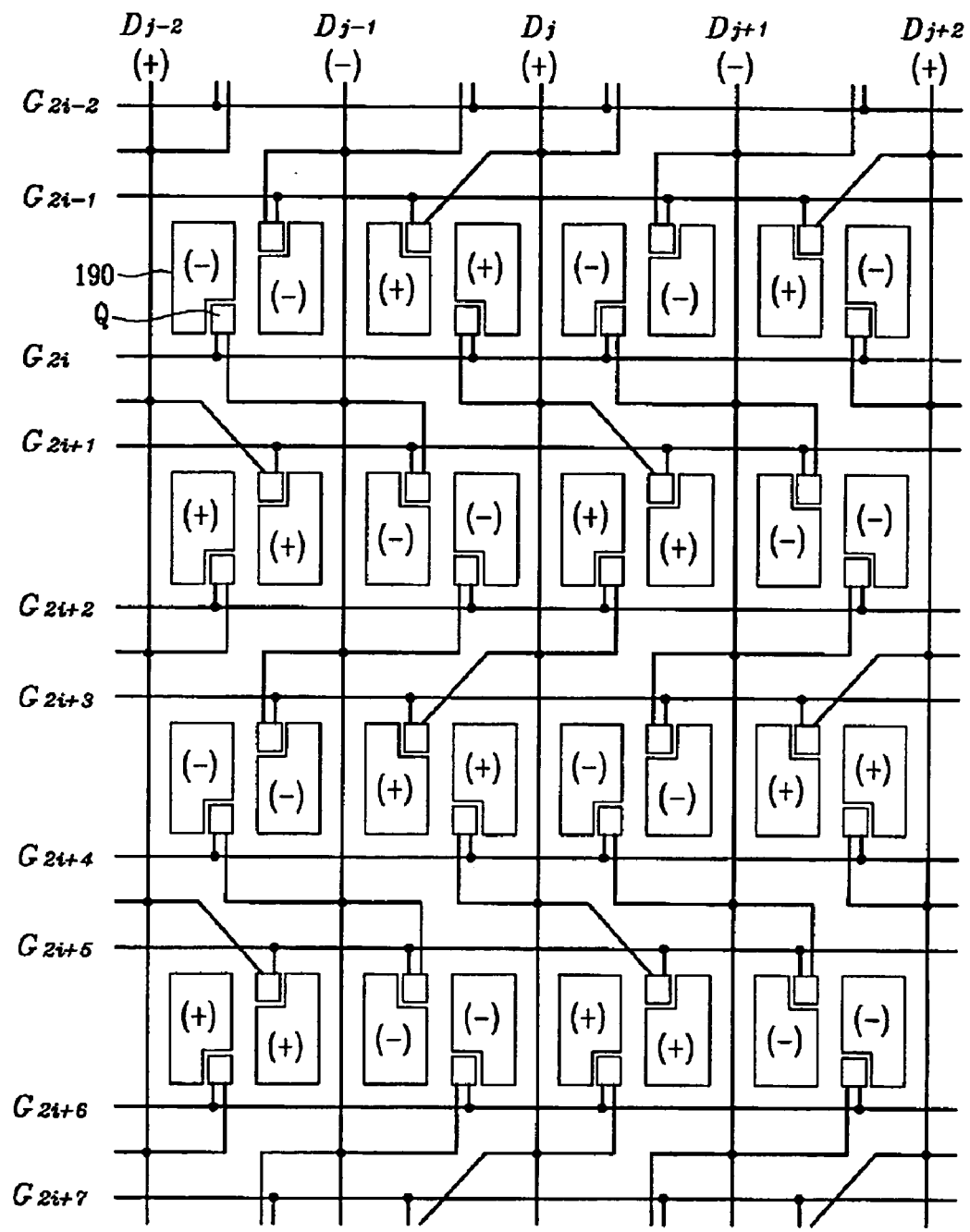

FIGS. 13, 14 and 15 schematically show arrangements of pixels in an LCD according to other embodiments of the invention, wherein the arrangement of pixels is similar to the arrangement of pixels shown in FIG. 8.

Each pair of gate lines $G_{2i-1}$ and $G_{2i}$ are arranged at the upper and lower sides of a row of pixel electrodes 190. Each data line $D_j$ is arranged between two adjacent columns of the pixel electrodes 190.

Two switching elements Q connected; e.g., coupled, with a pair of pixel electrodes 190 in a pixel row and arranged between two adjacent data lines, are connected; e.g., coupled, with different gate lines $G_{2i-1}$ and $G_{2i}$. For example, as shown in FIG. 13, a switching element Q arranged near an upper corner of a pixel electrode 190 is connected; e.g., coupled, with an upper gate line $G_{2i-1}$, and a switching element Q arranged near a lower corner of a pixel electrode 190 is connected; e.g., coupled, with the lower gate line $G_{2i}$.

Further, the switching elements Q are arranged near a longitudinal edge of the pixel electrodes 190, which is relatively distant from the data lines, and each interconnection connecting the switching elements Q with the data lines is arranged between two adjacent gate lines.

However, the connections between the switching elements Q and the data lines shown in FIGS. 13, 14 and 15 are different from the connections shown in FIG. 8, and such configuration is described below.

According to the arrangement shown in FIG. 13, the switching elements Q in each pair of pixels adjacent in the row direction (referred to as "pixel pair" hereinafter) are connected; e.g., coupled, with different data lines. Two adjacent pixels in the column direction are connected; e.g., coupled, with different data lines and have switching elements Q arranged at the opposite positions in the column direction. The switching elements Q of corresponding pixels in two pixel pairs adjacent in the row direction are connected; e.g., coupled, with different sided data lines and are arranged at opposite positions in the column direction. As a result, the pixel arrangement shown in FIG. 13 is obtained by repeatedly arranging a 2×4 pixel matrix in the row direction and the column direction.

In the arrangement shown in FIG. 14, the switching elements Q in each pixel pair are connected; e.g., coupled, with a single data line. Two pixels adjacent in the column direction are connected to different data lines and have switching elements Q arranged at the same position. Two pixel pairs adjacent in the row direction have the same configuration. As a result, the pixel arrangement shown in FIG. 14 is obtained by repeatedly arranging a 2×2 pixel matrix in the row direction and the column direction.

In the arrangement shown in FIG. 15, the switching elements Q in each pixel pair are connected; e.g., coupled, with a single data line. Two pixels adjacent in the column direction are connected; e.g., coupled, with different data lines and have switching elements Q arranged at the same position. The switching elements Q of corresponding pixels in two pixel pairs adjacent in the row direction are connected; e.g., coupled, with the same sided data lines and arranged at opposite positions in the column direction. As a result, the pixel arrangement shown in FIG. 15 is obtained by repeatedly arranging a 2×4 pixel matrix in the row direction and the column direction.

Pixel arrangements according to other embodiments of the invention are described below with reference to FIGS. 16, 17 and 18.

Figure 16:
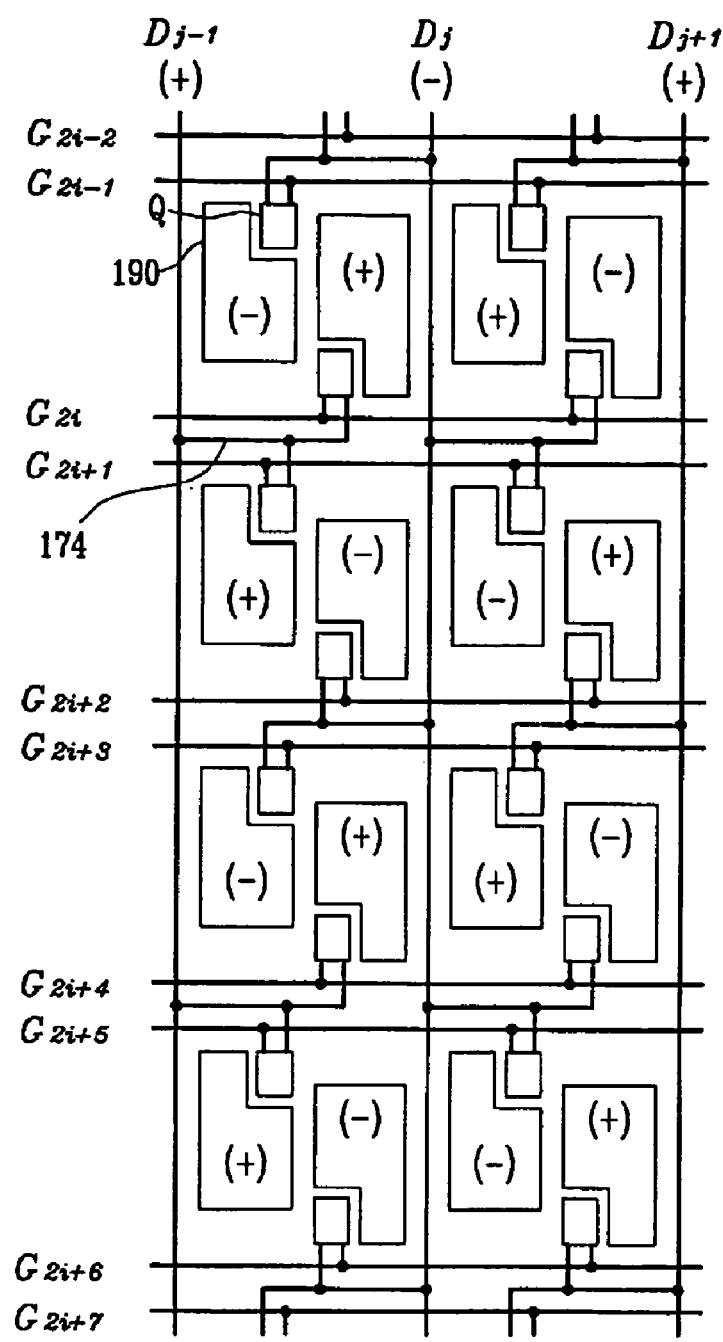
Figure 17:
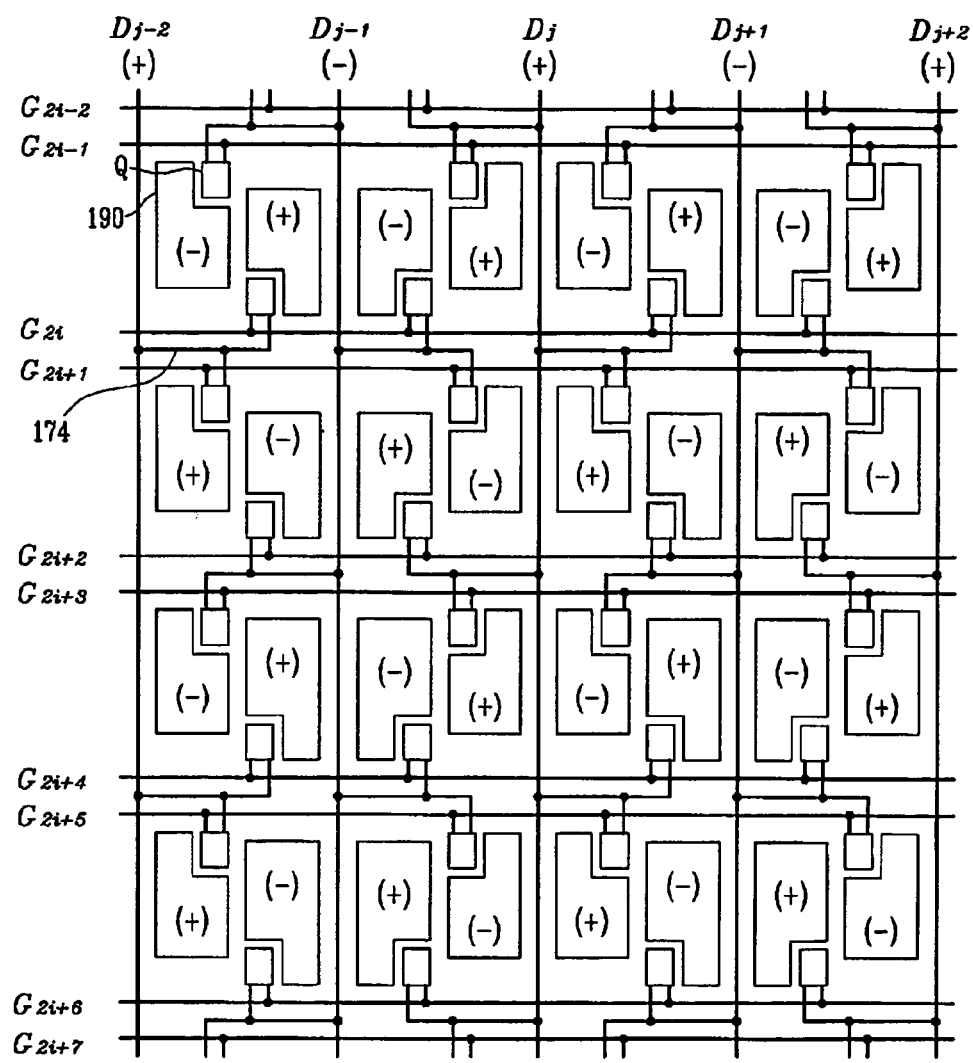
Figure 18:
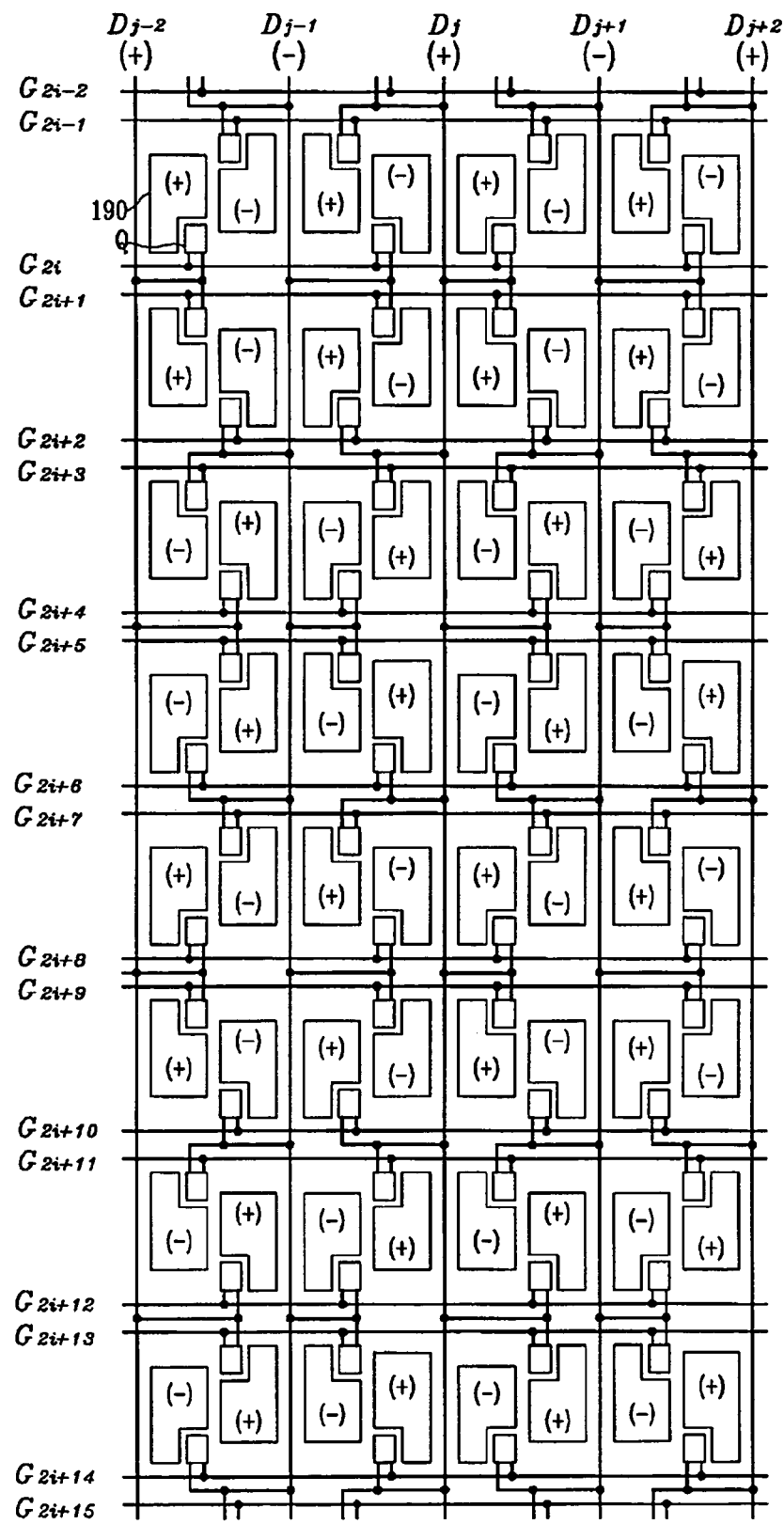

FIGS. 16, 17 and 18 schematically show arrangements of pixels in an LCD according to other embodiments of the invention, wherein the arrangement of pixels are similar to the arrangement shown in FIG. 8.

Each pair of gate lines $G_{2i-1}$ and $G_{2i}$ are arranged at the upper side and the lower side of a row of pixel electrodes 190. Each data line $D_j$ is arranged between two adjacent columns of the pixel electrodes 190.

Two switching elements Q in a pixel pair are connected; e.g., coupled, with different gate lines $G_{2i-1}$ and $G_{2i}$. For example, a switching element Q disposed near an upper corner of a pixel electrode 190 is connected; e.g., coupled, with an upper gate line $G_{2i-1}$, and a switching element Q disposed near a lower corner of a pixel electrode 190 is connected; e.g., coupled, with the lower gate line $G_{2i}$.

The switching elements Q are arranged near a longitudinal edge of the pixel electrodes 190, which is furthest from the data lines, and each interconnection 174 connecting the switching elements Q and the data lines is arranged between two adjacent gate lines.

The connections between the switching elements Q and the data lines shown in FIGS. 16-18 are different from those shown in FIG. 8. Two switching elements Q are connected to a single interconnection 174. For example, as shown in FIG. 16, in upper and lower pixel pairs adjacent in the column direction, a lower switching element Q of the upper pixel pair and an upper switching elements Q of the lower pixel pair are connected; e.g., coupled, with a single data line.

In the arrangement shown in FIG. 16, the switching elements Q in each pixel pair are connected; e.g., coupled, with different data lines. Two pixels adjacent in the column direction are connected; e.g., coupled, with different data lines and have switching elements Q arranged at the same position. Two pixel pairs adjacent in the row direction have the same configuration. As a result, the pixel arrangement shown in FIG. 16 is obtained by repeatedly arranging a 2×2 pixel matrix in the row direction and the column direction.

In the arrangement shown in FIG. 17, the switching elements Q in each pixel pair are connected; e.g., coupled, with different data lines. Two pixels adjacent in the column direction are connected; e.g., coupled, with different data lines and have switching elements Q arranged at the same position. The switching elements Q of corresponding pixels in two pixel pairs adjacent in the row direction are connected arranged different sided data lines and disposed at opposite positions in the column direction. As a result, the pixel arrangement shown in FIG. 17 is obtained by repeatedly arranging a 2×4 pixel matrix in the row direction and the column direction.

In the arrangement shown in FIG. 18, the switching elements Q in each pixel pair are connected; e.g., coupled, with different data lines. Two pixels adjacent in the column direction are connected; e.g., coupled, with a single data line or different data lines and have switching elements Q arranged at the same position or opposite-positions in the column direction. The switching elements Q of corresponding pixels in two pixel pairs adjacent in the row direction are connected; e.g., coupled, with different sided data lines and disposed at opposite positions in the column direction. As a result, the pixel arrangement shown in FIG. 18 is obtained by repeatedly arranging a 4×4 pixel matrix in the row direction and the column direction.

The polarity inversion types of data voltages in the LCDs shown in FIGS. 13, 14, 15, 16, 17, and 18 are described below.

The driver inversion in the LCDs shown in FIGS. 13, 14, 15, 16, 17, and 18 is a column inversion.

The inversion shown in FIGS. 13 and 17 is a 1×1 dot inversion. The inversion shown in FIGS. 14, 15 and 16 is a 1×2 dot inversion. The inversion shown in FIG. 18 is 2×1 dot inversion.

The above-described arrangements of the switching elements of the pixels realize a 1×2 dot-type apparent inversion for a given column-type driver inversion. The column-type driver inversion enables a variety of materials to be used for the data lines, thereby potentially reducing cost and simplifying the manufacturing process. The dot-type apparent inversion also disperses the difference in the luminance due to the kickback voltages between the positive-polarity pixel voltages and the negative-polarity pixel voltages to reduce vertical line defect.

The above-described structure and driving scheme according to the embodiment of the present invention reduce the number of the data driving IC chips while ensuring image quality.

It is understood that the invention is not limited to the embodiments discussed above and may be employed to other display devices such as OLED device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
   a plurality of pixels arranged in a matrix, each pixel having a pixel electrode and a switching element coupled thereto;
   a plurality of gate lines coupled with the switching elements and extending in a row direction of the matrix, each pixel row including at least two of the gate lines; and
   a plurality of data lines coupled with the switching elements, each data line extending in a column direction of the matrix,
   wherein each of the pixel electrodes is directly next to a neighboring data line and has a first edge and a second edge that are substantially parallel to the neighboring data line, wherein the second edge is farther from the neighboring data line than the first edge, and a switching element transmitting a data signal to the pixel electrode is arranged closer to the second edge than the first edge of the pixel electrode so as to reduce differences in light blocking areas between pixel electrodes in the row direction,
   wherein two directly neighboring pixels in the row direction in each pixel row are arranged between two directly neighboring data lines and form a pixel set, and the two directly neighboring pixels that form the pixel set are coupled with different gate lines, and
   wherein a distance from a first switching element coupled to one of the two directly neighboring pixels of the pixel set to a boundary region between the two directly neighboring pixels of the pixel set is less than a distance from the first switching element to the two directly neighboring data lines directly next to the pixel set.

2. The display device of claim 1, wherein each of the pixels in the pixel set are coupled with a same data line.

3. The display device of claim 1, wherein the pixels in the pixel set are coupled with different data lines.

4. The display device of claim 1, wherein adjacent pixels in a column are coupled with a same data line.

5. The display device of claim 1, wherein adjacent pixels in a column are coupled with different data lines.

6. The display device of claim 1, wherein the different gate lines coupled with the pixels in each pixel set are arranged at an upper side and a lower side of the pixels.

7. The display device of claim 1, wherein the switching elements for the two adjacent pixels of each pixel set occupy opposite positions in the column direction in respective pixels.

8. The display device of claim 7, wherein the switching elements of adjacent pixels in a column are arranged in substantially the same position.

9. The display device of claim 7, wherein the switching elements of adjacent pixels in a column are arranged in substantially opposite positions.

10. The display device of claim 7, wherein the switching elements of corresponding pixels in adjacent pixel sets in a row are arranged in substantially the same position.

11. The display device of claim 7, wherein the switching elements of corresponding pixels in two adjacent pixel sets in a row are arranged in substantially opposite positions.

12. The display device of claim 1, wherein the data lines and the switching elements are coupled by interconnections.

13. The display device of claim 12, wherein each of the interconnections is arranged between two adjacent gate lines.

14. The display device of claim 12, wherein each of the interconnections is coupled with two of the switching elements.

15. The display device of claim 1, wherein each of the switching elements comprises:
a gate electrode coupled with one of the gate lines and having a side that is substantially parallel to the gate lines;
a source electrode coupled with one of the data lines; and
a drain electrode coupled with one of the pixel electrodes and intersecting the side of the gate electrode.

16. The display device of claim 1, wherein a driver inversion of the display device is a column inversion.

17. The display device of claim 16, wherein an apparent inversion of the display device is a dot inversion.

18. The display device of claim 1, further comprising:
a light blocking member arranged between the pixel electrodes.

19. The display device of claim 18, wherein the light blocking member comprises:
a first portion that extends in the column direction and overlaps the data lines;
a second portion that extends in the column direction and does not overlap the data lines; and
a third portion that overlaps the switching elements, wherein the first portion is wider than the second portion.

20. A display device comprising:
a plurality of pixel electrodes arranged in a pixel matrix;
a plurality of switching elements each coupled to a pixel electrode of the plurality of pixel electrodes;
a plurality of gate lines coupled with the switching elements and extending in a row direction, two gate lines being arranged between two neighboring pixel rows; and
a plurality of data lines coupled with the switching elements and extending in a column direction,
wherein two directly neighboring pixel electrodes in the row direction in each pixel row are arranged between two directly neighboring data lines and form a pixel set, and the two directly neighboring pixels that form the pixel set are coupled with different gate lines,
a distance between a switching element coupled to a first pixel electrode included in the pixel set and a boundary between the first pixel electrode and a second pixel electrode adjacent to the first pixel electrode and included in the pixel set is less than a distance between the switching element coupled to the first pixel electrode and a data line directly next to the first pixel electrode,
two first switching elements each coupled with a first data line and with one of two adjacent first gate lines that extend between two neighboring pixel rows are coupled to pixel electrodes directly next to the first data line, and
two second switching elements each coupled with the first data line and with one of two adjacent second gate lines that are next to the two first gate lines and extend between two neighboring pixel rows are coupled to pixel electrodes each directly next to one of two second data lines neighboring the first data line.

21. The display device of claim 20, wherein the two first switching elements are disposed in different pixel rows, and the two second switching elements are disposed in different pixel rows.

22. The display device of claim 21, wherein the two first switching elements and the two second switching elements are alternately disposed in the column direction.

23. The display device of claim 22, wherein a pixel row is interposed between one of the two first switching elements and one of the two second switching elements, and the other one of the two first switching elements and the other one of the two second switching elements are disposed in the same pixel row.

24. The display device of claim 20, wherein different gate lines coupled with the first pixel electrode and the second pixel electrode in the pixel set are arranged at an upper side and a lower side of the pixel set.

25. The display device of claim 20, wherein the data lines and the switching elements are coupled by interconnections.

26. The display device of claim 25, wherein each of the interconnections is arranged between two adjacent gate lines.

27. The display device of claim 25, wherein each of the interconnections is coupled with two of the switching elements.

28. A display device comprising:
a plurality of pixel electrodes arranged in a pixel matrix;
a plurality of switching elements each coupled to a pixel electrode of the plurality of pixel electrodes;
a plurality of gate lines coupled with the switching elements and extending in a row direction, two gate lines being arranged between two neighboring pixel rows; and
a plurality of data lines coupled with the switching elements and extending in a column direction,
wherein two directly neighboring pixel electrodes in the row direction in each pixel row are arranged between two directly neighboring data lines and form a pixel set, and the two directly neighboring pixels that form the pixel set are coupled with different gate lines,
a distance between a switching element coupled to a first pixel electrode included in the pixel set and a boundary between the first pixel electrode and a second pixel electrode adjacent to the first pixel electrode and included in the pixel set is less than a distance between the switching element coupled to the first pixel electrode and a data line directly next to the first pixel electrode,
a first switching element coupled with a first data line and with one of two adjacent first gate lines that extend between two neighboring pixel rows is coupled to a pixel electrode directly next to the first data line,
a second switching element coupled with the first data line and with the other one of the two adjacent first gate lines is coupled to a pixel electrode directly next to a second data line neighboring the first data line, a third switching element coupled with the first data line and with one of two adjacent second gate lines that are next to the two first gate lines and extend between two neighboring pixel rows is coupled to a pixel electrode directly next to the first data line, and a fourth switching element coupled with the first data line and with the other one of the two adjacent second gate lines is coupled to a pixel electrode directly next to a third data line neighboring the first data line and opposing the second data line.

29. The display device of claim 28, wherein the first switching element and the second switching elements are disposed in different pixel rows, and the third switching element and the fourth switching elements are disposed in different pixel rows.

30. The display device of claim 29, wherein the first, second, third and fourth switching elements are alternately disposed in the column direction.

31. The display device of claim 30, wherein a pixel row is interposed between the first switching element and the fourth switching element, and the second switching element and the third switching element are disposed in the same pixel row.

32. The display device of claim 28, wherein different gate lines coupled with the first pixel electrode and the second pixel electrode in the pixel set are arranged at an upper side and a lower side of the pixel set.

33. The display device of claim 28, wherein the data lines and the switching elements are coupled by interconnections.

34. The display device of claim 28, further comprising:
two fifth switching elements each coupled with a fourth data line and with one of two adjacent third gate lines that extend between two neighboring pixel rows, the two fifth switching elements being coupled to pixel electrodes directly next to the fourth data line; and
two sixth switching elements each coupled with the fourth data line and with one of two adjacent fourth gate lines that are next to the two third gate lines and extend between two neighboring pixel rows, the two sixth switching elements being coupled to pixel electrodes each directly next to one of two fifth data lines neighboring the fourth data line.

35. The display device of claim 34, wherein the first data line and the fourth data line neighbor each other, and one of the fifth data lines is the same as the first data line.

* * * * *